(12) United States Patent
Wu et al.

(10) Patent No.: US 12,047,287 B2
(45) Date of Patent: Jul. 23, 2024

(54) DATA TRANSMISSION METHOD AND APPARATUS, NETWORK ADAPTER, AND STORAGE MEDIUM

(71) Applicant: Tencent Technology (Shenzhen) Company Limited, Shenzhen (CN)

(72) Inventors: Haorui Wu, Shenzhen (CN); Chao Pei, Shenzhen (CN); Liang Wang, Shenzhen (CN); Jian Wang, Shenzhen (CN); Ruiqing Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 353 days.

(21) Appl. No.: 17/521,770

(22) Filed: Nov. 8, 2021

(65) Prior Publication Data
US 2022/0070095 A1 Mar. 3, 2022

Related U.S. Application Data
(63) Continuation of application No. PCT/CN2020/119021, filed on Sep. 29, 2020.

(30) Foreign Application Priority Data
Dec. 31, 2019 (CN) .......................... 201911409353.6

(51) Int. Cl.
*H04L 12/46* (2006.01)
*H04L 12/741* (2013.01)
*H04L 45/74* (2022.01)

(52) U.S. Cl.
CPC .......... *H04L 45/74* (2013.01); *H04L 12/4633* (2013.01)

(58) Field of Classification Search
None
See application file for complete search history.

(56) References Cited

U.S. PATENT DOCUMENTS

2015/0009995 A1* 1/2015 Gross, IV ........... H04L 12/4633
370/392
2015/0052525 A1 2/2015 Raghu
(Continued)

FOREIGN PATENT DOCUMENTS

| CN | 106101023 A | 11/2016 |
| CN | 107357660 A | 11/2017 |

(Continued)

OTHER PUBLICATIONS

Tencent Technology, ISR, PCT/CN2020/119021, Dec. 30, 2020, 2 pgs.
(Continued)

*Primary Examiner* — Hong Shao
(74) *Attorney, Agent, or Firm* — Morgan, Lewis & Bockius LLP

(57) ABSTRACT

Embodiments of this application disclose a data transmission method performed by a sender network adapter associated with a sender server. The method includes: acquiring an original data packet, a first address, and a tenant identifier, the first address comprising an address of a receiver network adapter associated with a receiver server, and the tenant identifier being used for indicating a corresponding tenant on the receiver server; performing tunnel encapsulation on the original data packet based on the first address and the tenant identifier to obtain a tunnel data packet; sending the tunnel data packet to the receiver network adapter; decapsulating, by the receiver network adapter, the tunnel data packet to obtain the original data packet and the tenant identifier; and transmitting the original data packet and the
(Continued)

Original data packet:

| 411 | 412 | 413 | 414 |
|---|---|---|---|
| Second MAC address | Second IP address | TCP/UDP protocol | Transmission data |
| | DSCP \| ECN | | |

Encapsulating ⇩

Tunnel data packet:

| 421 | 422 | 423 | 424 | 425 | 426 |
|---|---|---|---|---|---|
| First MAC address | First IP address | GRE protocol | Second IP address | TCP/UDP protocol | Transmission data |
| | DSCP \| ECN | | DSCP \| ECN | | | tenant identifier to the receiver server, which is configured to deliver the original data packet to a tenant corresponding to the tenant identifier.

17 Claims, 12 Drawing Sheets

(56) References Cited

U.S. PATENT DOCUMENTS

2016/0087941 A1 3/2016 Mudigonda et al.
2016/0188527 A1* 6/2016 Cherian .................. H04L 41/12
709/212

FOREIGN PATENT DOCUMENTS

| CN | 108494817 A | 9/2018 |
|---|---|---|
| CN | 109617995 A | 4/2019 |
| CN | 110058987 A | 7/2019 |
| CN | 110061923 A | 7/2019 |
| CN | 110071900 A | 7/2019 |
| CN | 111193653 A | 5/2020 |
| EP | 2922251 A1 | 9/2015 |
| WO | WO 2017177401 A1 | 10/2017 |

OTHER PUBLICATIONS

Tencent Technology, WO, PCT/CN2020/119021, Dec. 30, 2020, 5 pgs.
Tencent Technology, IPRP, PCT/CN2020/119021, Jul. 5, 2022, 6 pgs.
Extended European Search Report and Supplementary Search Report, EP20910111.2, Sep. 21, 2022, 8 pgs.
Tencent Technology, European Office Action, EP Application No. 20910111.2, Mar. 1, 2024, 3 pgs.

* cited by examiner

Original data packet:

Tunnel data packet:

DATA TRANSMISSION METHOD AND APPARATUS, NETWORK ADAPTER, AND STORAGE MEDIUM

CROSS-REFERENCE TO RELATED APPLICATIONS

This application is a continuation application of PCT Patent Application No. PCT/CN2020/119021, entitled "DATA TRANSMISSION METHOD AND APPARATUS, NETWORK CARD AND STORAGE MEDIUM" filed on Sep. 29, 2020, which claims priority to Chinese Patent Application No. 201911409353.6, filed with the State Intellectual Property Office of the People's Republic of China on Dec. 31, 2019, and entitled "DATA TRANSMISSION METHOD AND APPARATUS, NETWORK ADAPTER, AND STORAGE MEDIUM", all of which are incorporated herein by reference in their entirety.

FIELD OF THE TECHNOLOGY

Embodiments of this application relate to the field of communication technologies, and in particular, to a data transmission method and apparatus, a network adapter, and a storage medium.

BACKGROUND OF THE DISCLOSURE

Remote direct memory access (RDMA) is a technology for remote direct memory access. Any system configured with an RDMA network adapter can directly transmit data to a storage area of a remote system by using the RDMA technology without affecting an operating system of the remote system, and a central processing unit (CPU) of the remote system does not need to participate in a data transmission process, thereby reducing consumption of resources and further improving performance of the operating system. The system configured with the RDMA network adapter is characterized in high bandwidth, low latency, and low processor occupancy.

However, in a public cloud environment, a third-party service provider provides a service on a public network, so that a plurality of tenants can access the public network and enjoy the service provided by the third-party service provider. However, because the public network is shared, if tenants cannot be isolated from each other, data of one tenant may be detected by another tenant, and data security cannot be ensured. Therefore, a method that can isolate data of each tenant in a public cloud when the RDMA technology is implemented in the public cloud is urgently required to ensure the data security.

SUMMARY

Embodiments of this application provide a data transmission method and apparatus, a network adapter, and a storage medium to improve data transmission security. The technical solutions are as follows.

According to a first aspect, a data transmission method is performed by a sender network adapter associated with a sender server, the method including:

acquiring an original data packet, a first address, and a tenant identifier, the first address including an address of a receiver network adapter associated with a receiver server for receiving the original data packet, and the tenant identifier being used for indicating a corresponding tenant on the receiver server, wherein there is a remote direct memory access (RDMA) connection between the sender server and the receiver server and the original data packet is an RDMA data packet;

performing tunnel encapsulation on the original data packet based on the first address and the tenant identifier to obtain a tunnel data packet; and sending the tunnel data packet to the receiver network adapter corresponding to the first address.

In some embodiments, the original data packet includes a first differentiated services code point (DSCP) value or a second DSCP value, the first DSCP value being used for indicating that the original data packet is an RDMA data packet, and the second DSCP value being used for indicating that the original data packet is a transmission control protocol/internet protocol (TCP/IP) data packet; and the establishing a remote direct memory access (RDMA) connection to a receiver server in response to that an original data packet is acquired by using a sender virtual machine includes:

establishing the RDMA connection to the receiver server in response to that the original data packet is acquired by using the sender virtual machine and the original data packet includes the first DSCP value.

According to another aspect, a sender network adapter associated with a sender server is provided, the network adapter comprising a processor and a memory storing a plurality of programs that, when executed by the processor, cause the sender network adapter to implement the operations performed in the foregoing data transmission method.

According to still another aspect, a non-transitory computer-readable storage medium is provided, storing a plurality of programs, the plurality of programs being executed by a processor of a sender network adapter associated with a sender server to implement the operations performed in the foregoing data transmission method.

According to the method, the apparatus, and the device network adapter, and the storage medium that are provided in the embodiments of this application, an original data packet, a first address, and a tenant identifier are acquired; tunnel encapsulation is performed on the original data packet based on the first address and the tenant identifier to obtain a tunnel data packet; and the tunnel data packet is sent to a receiver network adapter corresponding to the first address. The receiver network adapter decapsulates, in response to that the tunnel data packet is received, the tunnel data packet to obtain the original data packet and the tenant identifier; and transmits the original data packet and the tenant identifier to a receiver server, the receiver server being configured to deliver the original data packet to a tenant corresponding to the tenant identifier. Therefore, by performing tunnel encapsulation, tenants may be distinguished from each other based on tenant identifiers, and data of each tenant in a public cloud can be isolated, thereby ensuring data security.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from the accompanying drawings without creative efforts.

DESCRIPTION OF EMBODIMENTS

Figure 1:
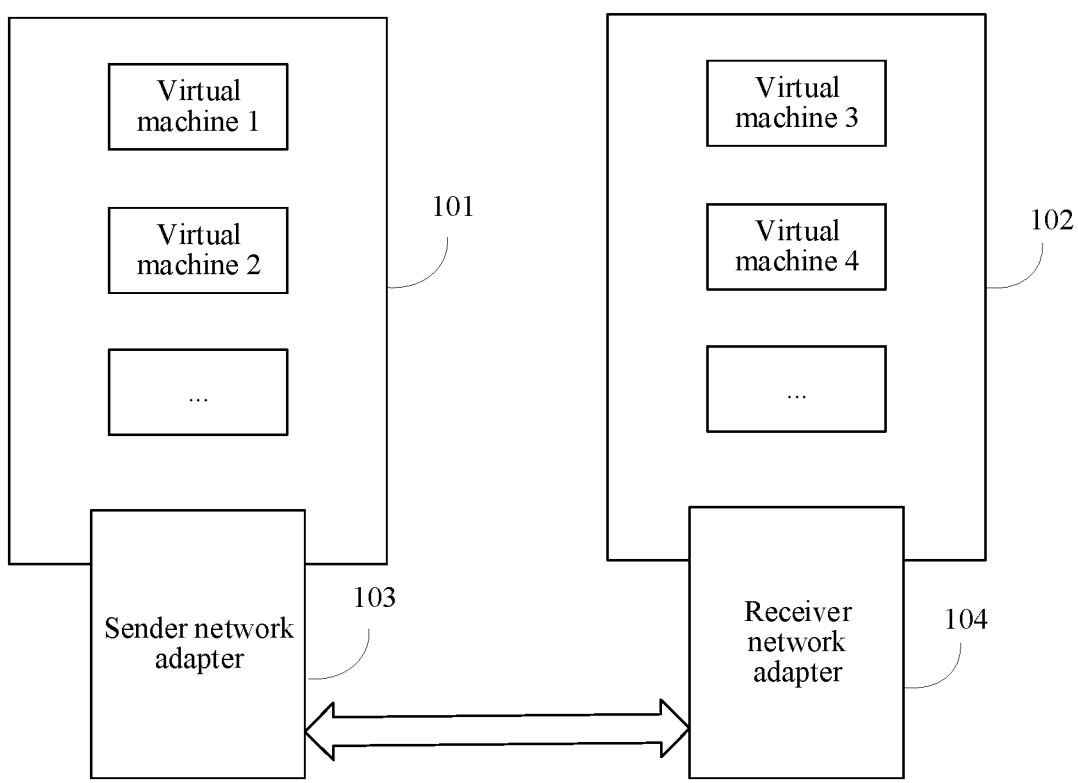
FIG. 1 is a schematic diagram of an implementation environment according to an embodiment of this application.

To make objectives, technical solutions, and advantages of the embodiments of this application clearer, the following further describes in detail implementations of this application with reference to the accompanying drawings.

For ease of understanding a technical process in the embodiments of this application, some terms used in the embodiments of this application are described below.

A virtual private cloud (VPC) is a private network on a public cloud, is an on-demand configurable pool of public cloud computing resources, and is implemented based on a tunneling protocol, for example, is a cloud network implementing multi-tenant isolation based on a generic routing encapsulation (GRE) protocol or a virtual extensible local area network (VxLAN) protocol. The VPC can construct, for a cloud server, an isolated virtual network environment configured and managed by a user, improving security of a resource in a user cloud and simplifying a network deployment of a user.

Remote direct memory access (RDMA) is a technology for remote direct memory access. Any system can directly transmit data to a storage area of a remote system by using the RDMA technology without affecting an operating system of the remote system, and a CPU of the remote system does not need to participate in a data transmission process, thereby reducing consumption of resources and further improving performance of the operating system. The system is characterized in high bandwidth, low latency, and low processor occupancy.

A tunneling protocol is used for implementing a tunneling technology. The essence of the tunneling technology is to use a protocol of one network layer to transmit a protocol of another network layer, and basic functions of the tunneling technology is data packet encapsulation and decapsulation. Encapsulation is a basic means for constructing a tunnel. From the perspective of two ends of a tunnel, encapsulation is to create, maintain, and revoke a tunnel to hide and abstract information.

An overlay network is established above an underlay network. The overlay network and the underlay network are a pair of opposite concepts. For example, a layer 2 network is an underlay network of a layer 3 network, and the layer 3 network is an overlay network of the layer 2 network. In a public cloud network, the underlay network is mainly an outer layer network of a tunneling protocol such as the GRE or the VxLAN, and the overlay network is an inner layer network of a tunneling protocol such as the GRE or the VxLAN.

It may be understood that the terms "first", "second", and the like used in this application may be used for describing various concepts in this specification. However, the concepts are not limited by the terms unless otherwise specified. The terms are merely used for distinguishing one concept from another concept. For example, without departing from the scope of this application, a first address may be referred to as a second address; and similarly, the second address may be referred to as the first address.

The term "at least one" used in this application includes one or more, and a quantity of at least one is an integer. For example, the at least one is 1, 2, 3, or the like. The term "a plurality" used in this application includes two or more, and a quantity of a plurality is an integer. For example, the plurality is 2, 3, 4, or the like. The term "each" as used in this application refers to each of a corresponding plurality. For example, a plurality of virtual machines are three virtual machines, and each of the plurality of virtual machines refers to each virtual machine in the three objects. The term "any" as used in this application refers to any of a corresponding plurality. For example, a plurality of virtual machines are three virtual machines, and any of the plurality of virtual machines refers to any virtual machine in the three virtual machines.

FIG. 1 is a schematic diagram of an implementation environment according to an embodiment of this application. Referring to FIG. 1, the implementation environment includes a sender server 101 and a receiver server 102. The sender server 101 is configured with a sender network adapter 103, and the receiver server 102 is configured with a receiver network adapter 104. The sender server 101 establishes an RDMA connection to the receiver server 102, and transmits data to the receiver network adapter 104 by using the sender network adapter 103.

The sender server 101 and the receiver server 102 are both connected to a public cloud network, and run virtual machines connected to the public cloud network. The sender server 101 acquires an original data packet by using a sender virtual machine and delivers the original data packet to the sender network adapter 103, and the sender network adapter 103 performs tunnel encapsulation. Information, such as a tenant identifier and an IP address, required in the encapsulation is delivered by a network management system to the sender network adapter 103. The sender network adapter 103 sends the encapsulated data packet to the receiver network adapter 104 through the RDMA connection, and the receiver network adapter 104 decapsulates the data packet to obtain the original data packet and the tenant identifier. The receiver server 102 delivers the original data packet to a tenant corresponding to the tenant identifier when acquiring the original data packet and the tenant identifier by using the receiver network adapter 104. Therefore, multi-tenant isolation is implemented on a public cloud based on a tunneling protocol, ensuring data packet security.

Figure 2:
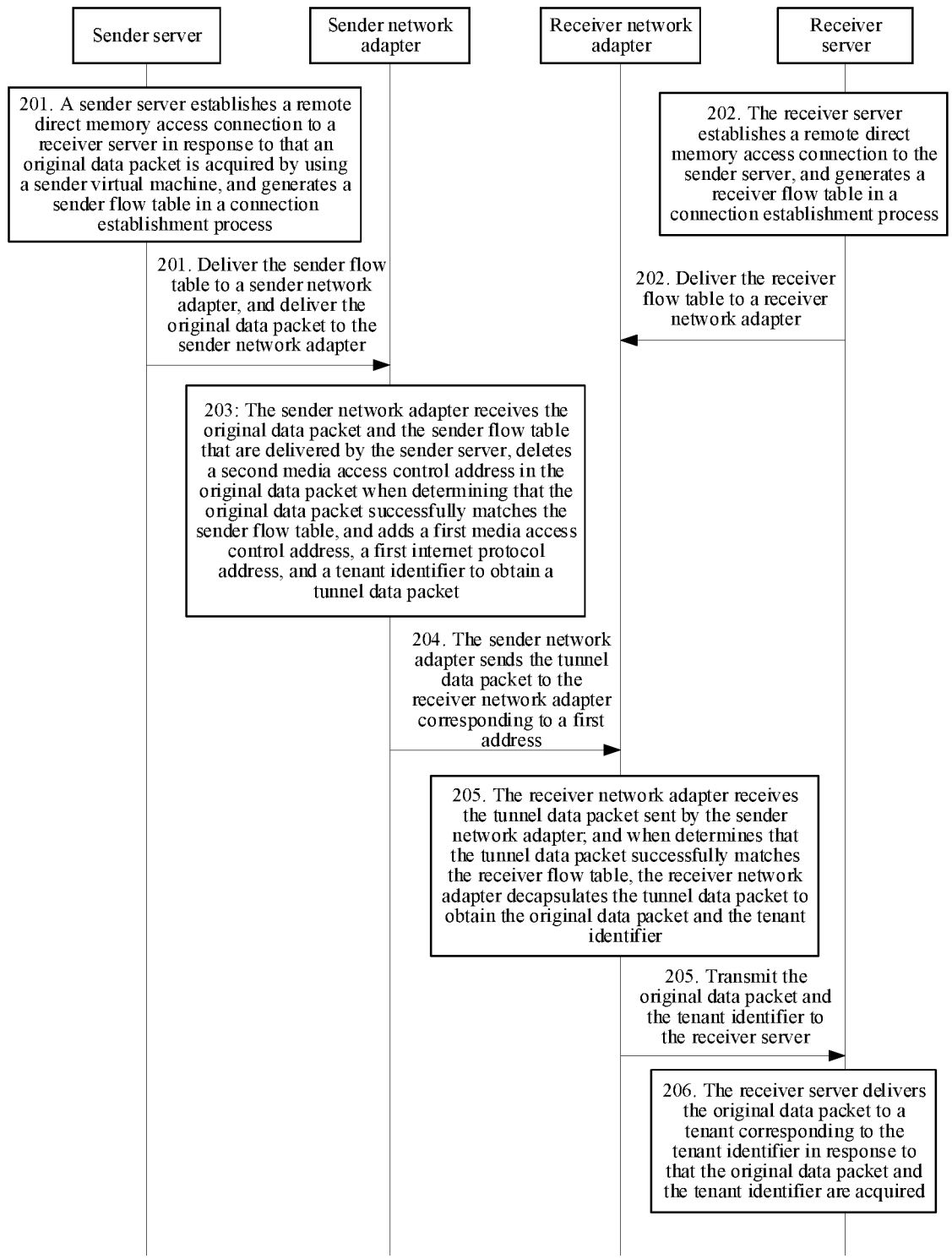
FIG. 2 is a flowchart of a data transmission method according to an embodiment of this application.

FIG. 2 is a flowchart of a data transmission method according to an embodiment of this application. Interaction subjects in this embodiment of this application are a sender server, a sender network adapter, a receiver server, and a receiver network adapter. Referring to FIG. 2, the method includes the following steps:

201. The sender server establishes an RDMA connection to the receiver server in response to that an original data packet is acquired by using a sender virtual machine, generates a sender flow table in a process of establishing the RDMA connection, delivers the sender flow table to the sender network adapter, and delivers the original data packet to the sender network adapter.

In this embodiment of this application, one application scenario is that one or more virtual machines run on the sender server, and each tenant owns a virtual machine; and a plurality of virtual machines also run on the receiver server, and each tenant owns at least one virtual machine. When a tenant owns a plurality of virtual machines, the plurality of virtual machines form a virtual network.

An RDMA application, such as a social application or an email application, runs in a virtual machine. RDMA applications on virtual machines of different servers need to exchange data. When an RDMA application on a virtual machine of the sender server generates data in a running process, an RDMA base is invoked to generate an original data packet based on the data. The original data packet is an RDMA data packet, and the sender server sends the original data packet to an RDMA application on a virtual machine of the receiver server by using the sender network adapter.

Therefore, after receiving the original data packet from the RDMA application by using the sender virtual machine, the sender server determines to transmit data to the receiver server. In this case, the sender server establishes the RDMA connection to the receiver server, acquires an interaction parameter such as a source IP address, a destination IP address, or a network adapter physical port number in the process of establishing the RDMA connection, generates the sender flow table based on the interaction parameter, and delivers the sender flow table to the sender network adapter of the sender server.

A flow table is a rule for processing a data packet, and is also referred to as a forwarding rule. In some embodiments, the rule is a preset rule. The flow table includes at least one flow entry, which is a minimum unit of the flow table. Each flow entry determines a data flow transmitted in a network. The flow entry includes at least: a match, a priority, a counter, an action, and a timeout interval. The match may be used for matching a data packet. In some embodiments, the match includes a source MAC address, a destination MAC address, a source IP address, a destination IP address, and the like; the priority may be used for indicating a priority relationship between flow tables, and the flow tables are sequentially matched based on priorities; the counter may be used for counting a quantity of data packets; the instruction may be used for forwarding or discarding a data packet based on a match result between the match and the data packet; and the timeout interval may be used for indicating a maximum valid time or a maximum idle time of the flow table, and the flow table is deleted based on the timeout interval.

Figure 3:
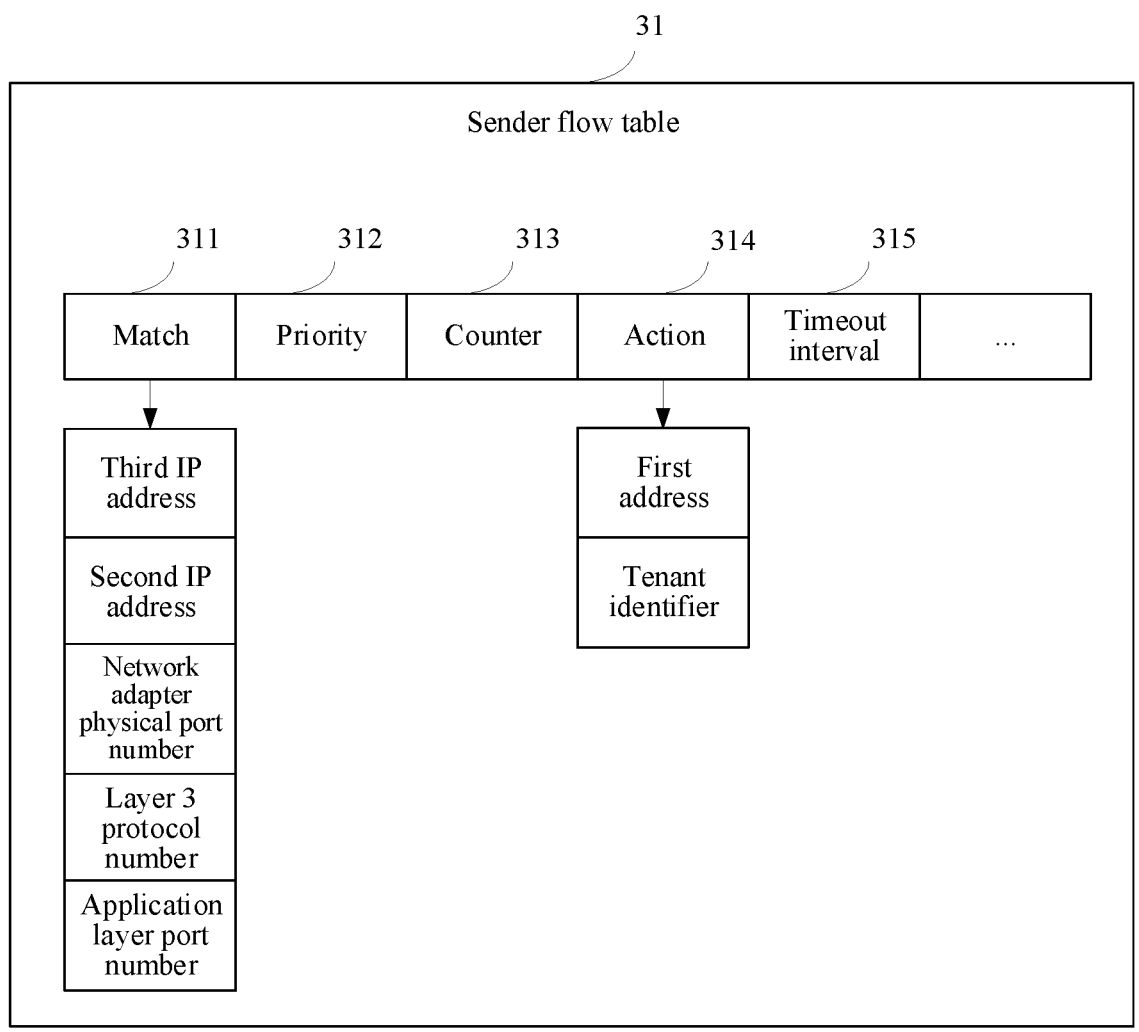
FIG. 3 is a schematic structural diagram of a flow table according to an embodiment of this application.

In this embodiment of this application, the sender flow table may be used for instructing the sender network adapter to process the original data packet. The sender flow table includes a match and an action. The match is used for determining a type of a data packet, and the action is used for determining an action performed on a data packet. As shown in FIG. 3, a sender flow table 31 includes a match 311, a priority 312, a counter 313, an action 314, a timeout interval 315, and the like. The match of the sender flow table includes a third IP address, a second IP address, a network adapter physical port number, a layer 3 protocol number, and an application layer port number. The third IP address is an IP address of a sender virtual machine, and the second IP address is an IP address of a receiver virtual machine. The action of the sender flow table includes a first address and a tenant identifier. The first address includes an address of a receiver network adapter for receiving an original data packet, the tenant identifier is used for indicating a corresponding tenant on a receiver server, and the tenant identifier is a 32-bit number.

In some embodiments, the sender network adapter of the sender server is a network adapter supporting RDMA over Converged Ethernet (RoCE), and can provide a function such as data encapsulation. RoCE is a network protocol that allows remote direct memory access over an Ethernet network. For example, the RoCE is RoCE v1 or RoCE v2.

When the sender server acquires the original data packet by using the sender virtual machine and the original data packet includes a first differentiated services code point (DSCP) value, the sender server determines that the original data packet is an RDMA data packet, and therefore, establishes an RDMA connection for data transmission. The sender server establishes the RDMA connection to the receiver server, and needs to establish a transmission control protocol/internet protocol (TCP/IP) connection to obtain interaction information. The sender server and the receiver server acquire a TCP/IP data packet generated in a process of establishing the TCP/IP connection, and generate a sender flow table and a receiver flow table based on the interaction information carried in the TCP/IP data packet.

The original data packet includes a first differentiated services code point (DSCP) value or a second DSCP value. The first DSCP value is used for indicating that the original data packet is an RDMA data packet, and the second DSCP value is used for indicating that the original data packet is a TCP/IP data packet. Therefore, whether an original data packet is an RDMA data packet transmitted through the RDMA connection or a conventional TCP/IP data packet can be identified by assigning different DSCP values to the original data packet. A transmission network distinguishes between different data packets based on the first DSCP value and the second DSCP value to implement isolation and flow control, thereby resolving a problem of isolation in the RDMA network and the conventional TCP/IP network.

202. The receiver server establishes an RDMA connection to the sender server, generates a receiver flow table in a process of establishing the RDMA connection, and delivers the receiver flow table to the receiver network adapter.

The receiver flow table is used for instructing the receiver network adapter to process a tunnel data packet. The receiver flow table is similar to the sender flow table in step 201, and details are not described herein again.

In this embodiment of this application, only an example in which the sender server actively initiates an RDMA connection request to the receiver server is used for description. Alternatively, in another embodiment, the receiver server may actively initiate the RDMA connection request to the sender server, and the sender server receives the RDMA connection request from the receiver server.

In addition, the process in which the sender server establishes the RDMA connection to the receiver server in step 201 and the process in which the receiver server establishes the RDMA connection to the sender server in step 202 are the same process. Therefore, in the process of establishing the RDMA connection, the sender flow table and the receiver flow table may be delivered at the same time.

203: The sender network adapter receives the original data packet and the sender flow table that are delivered by the sender server, deletes a second MAC address in the original data packet when determining that the original data packet successfully matches the sender flow table, and adds a first MAC address, a first IP address, and a tenant identifier to obtain a tunnel data packet.

The original data packet carries a second address. The second address includes an address of the receiver virtual machine, and may be used for indicating a virtual machine of a tenant. The address of the receiver virtual machine includes the second Media Access Control (MAC) address and the second internet protocol (IP) address. The second MAC address is a MAC address of the receiver virtual machine, and the second IP address is an IP address of the receiver virtual machine. A virtual network can send the original data packet to a virtual machine corresponding to the second address based on the second address.

The sender flow table includes a first address and a tenant identifier. The first address includes the address of the receiver network adapter. The first address includes the first MAC address and the first IP address. The first MAC address includes a MAC address of the receiver network adapter and a MAC address of the sender network adapter. The first IP address includes an IP address of the receiver network adapter and an IP address of the sender network adapter. After the sender server delivers the original data packet to the sender network adapter, the sender network adapter performs flow table query when receiving the original data packet, and acquires the first MAC address, the first IP address, and the tenant identifier from the sender flow table when determining that the original data packet successfully matches the sender flow table.

In this case, that the sender network adapter performs tunnel encapsulation on the original data packet to obtain the tunnel data packet includes: The sender network adapter deletes the second MAC address in the original data packet, and adds the first MAC address, the first IP address, and the tenant identifier to obtain the tunnel data packet.

In the related art, a flow table is classified based on per flow (a pair of IP addresses and a pair of port numbers). A field in the flow table includes a source IP address, a destination IP address, a destination port number, and a source port number. A server generates a flow table in a per flow manner, and delivers the flow table to a network adapter. The network adapter queries a flow table corresponding to a destination port number and a source port number based on a source IP address and a destination IP address in the per flow manner. However, in this embodiment of this application, a flow table is classified based on per destination (a pair of IP addresses and a destination port number). A field in the flow table includes a source IP address, a destination IP address, and a destination port number. A server generates a flow table in a per destination manner, and delivers the flow table to a network adapter. The network adapter queries a flow table corresponding to a destination port number based on a source IP address and a destination IP address in the per destination manner. Therefore, according to the method provided in this embodiment of this application, classification is performed based on only the destination port number without considering the source port number. In this way, classification categories are reduced, a query speed for the flow table is faster, latency is lower, and resources of the sender network adapter and the receiver network adapter are saved.

In some embodiments, the original data packet further includes a third IP address, a second IP address, a layer 3 protocol number, and an application layer port number. The third IP address is an IP address of the sender virtual machine. The second IP address is an IP address of the receiver virtual machine. The sender network adapter may acquire a network adapter physical port number corresponding to the original data packet when receiving the original data packet, and therefore, may determine a transmission direction of the original data packet based on the third IP address, the second IP address, the layer 3 protocol number, the application layer port number, and the network adapter physical port number that correspond to the original data packet. The sender flow table includes a match. The match includes a third IP address, a second IP address, a layer 3 protocol number, an application layer port number, and a network adapter physical port number. In this case, a transmission direction of a data packet corresponding to the sender flow table may be determined based on the third IP address, the second IP address, the layer 3 protocol number, the application layer port number, and the network adapter physical port number in the sender flow table. Therefore, when a parameter corresponding to the original data packet is the same as a parameter in the sender flow table, it is determined that the original data packet successfully matches the sender flow table.

In a possible implementation, the original data packet of the sender virtual machine arrives at the sender network adapter through the sender server. That the sender network adapter encapsulates the tunnel data packet based on the sender flow table includes: deleting the second MAC address in the original data packet, and adding the first MAC address, the first IP address, and the tenant identifier to obtain the tunnel data packet.

In some embodiments, the original data packet includes a header and a body, the header of the original data packet includes a second MAC address field and a second IP address field, the second MAC address field includes the second MAC address, the second IP address field includes the second IP address, an explicit congestion notification (ECN) value, and a DSCP value, and the body of the original data packet includes transmission data.

In some embodiments, the tunnel data packet includes a header and a body, the header of the tunnel data packet includes a first MAC address field, a first IP address field, and a tunneling protocol field, the first MAC address field includes the first MAC address, the first IP address field includes the first IP address, the tunneling protocol field includes the tenant identifier, and the body of the tunnel data packet includes the second IP address field and the transmission data.

In this case, the method further includes: writing the ECN value and the DSCP value in the second IP address field of the original data packet to the first IP address field of the tunnel data packet.

The ECN value is used for controlling congestion, to be specific, when a device in a network detects potential congestion, writing an ECN value with a congestion identifier to each data packet, or writing an ECN value with a congestion identifier to a plurality of randomly selected data packets. Therefore, the original data packet may include an ECN value with a congestion identifier. The DSCP value is used for distinguishing whether the original data packet is an RDMA data packet or a conventional TCP/IP data packet.

Figure 4:
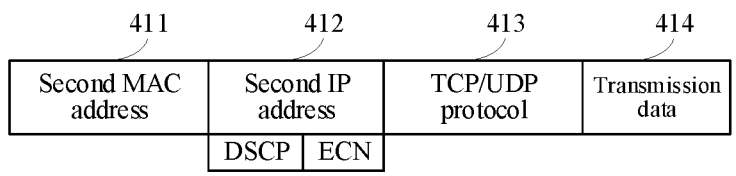
FIG. 4 is a schematic structural diagram of a data packet according to an embodiment of this application.
Figure 4:
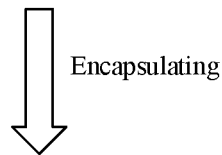
Figure 4:
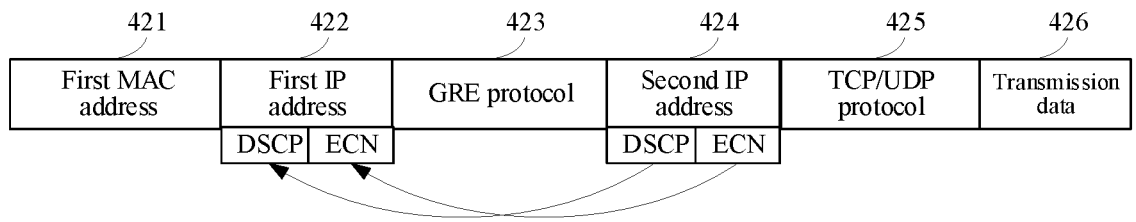

As shown in FIG. 4, a header of the original data packet includes a second MAC address field 411, a second IP address field 412, and a TCP/UDP protocol field 413; and a body of the original data packet includes a transmission data field 414. The second MAC address field 411 includes a second MAC address. The second IP address field 412 includes a second IP address, a DSCP value, and an ECN value. The TCP/UDP protocol field 413 includes a TCP/UDP protocol. The transmission data field 414 includes to-be-transmitted transmission data. The second MAC address field 411 of the original data packet is deleted, a first MAC address field, a first IP address field, and a GRE protocol field are added, and the DSCP value and the ECN value in the second IP address field 412 are copied to the first IP address field to obtain a tunnel data packet. As shown in FIG. 4, the header of the tunnel data packet includes a first MAC address field 421, a first IP address field 422, and a GRE protocol field 423; and the body of the tunnel data packet includes a second IP address field 424, a TCP/UDP protocol field 425, and a transmission data field 426. The first MAC address field 421 includes a first MAC address. The first IP address field 422 includes a first IP address, a DSCP value, and an ECN value. The GRE protocol field 423 includes a GRE protocol, and the GRE protocol carries a tenant identifier.

By performing step 203, tunnel encapsulation may be performed on the original data packet based on the first address and the tenant identifier to obtain the tunnel data packet. In some embodiments, for tunnel encapsulation performed based on the tunneling protocol such as GRE or VxLAN or tunnel encapsulation performed based on another tunneling protocol, it is only necessary to ensure that an obtained tunnel data packet can carry a tenant identifier.

Figure 5:
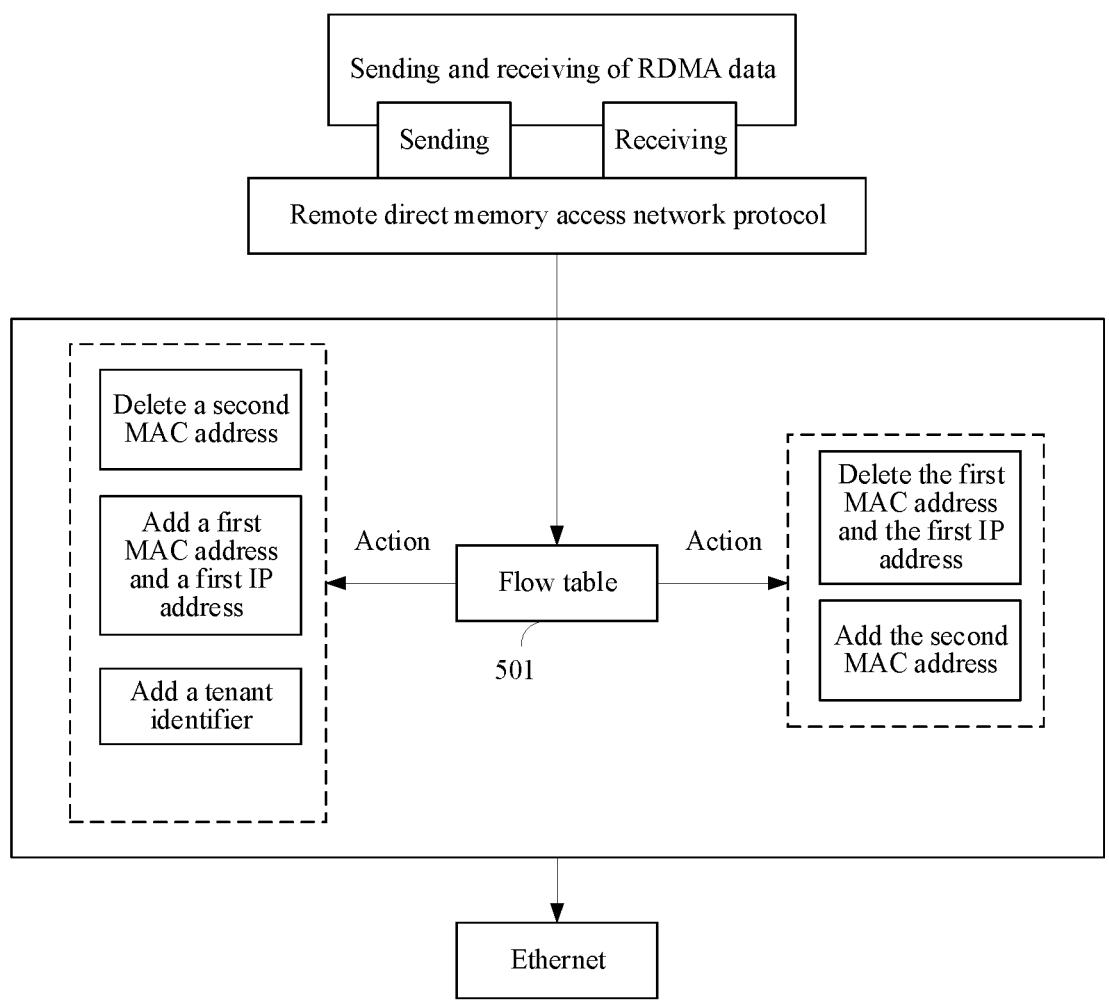
FIG. 5 is a schematic diagram of flow table matching according to an embodiment of this application.

FIG. 5 is a schematic diagram of flow table match according to an embodiment of this application. Referring to FIG. 5, a flow table 501 needs to be matched in processes of sending and receiving RDMA data. The flow table 501 is a sender flow table or a receiver flow table. When the flow table 501 is hit in a sending direction, a second MAC address of an original data packet is deleted, and a first MAC address, a first IP address, and a tenant identifier are added to obtain a tunnel data packet; when the flow table 501 is hit in a receiving direction, the first MAC address and the first IP address of the tunnel data packet are deleted, and the second MAC address is added to obtain the original data packet.

Figure 6:
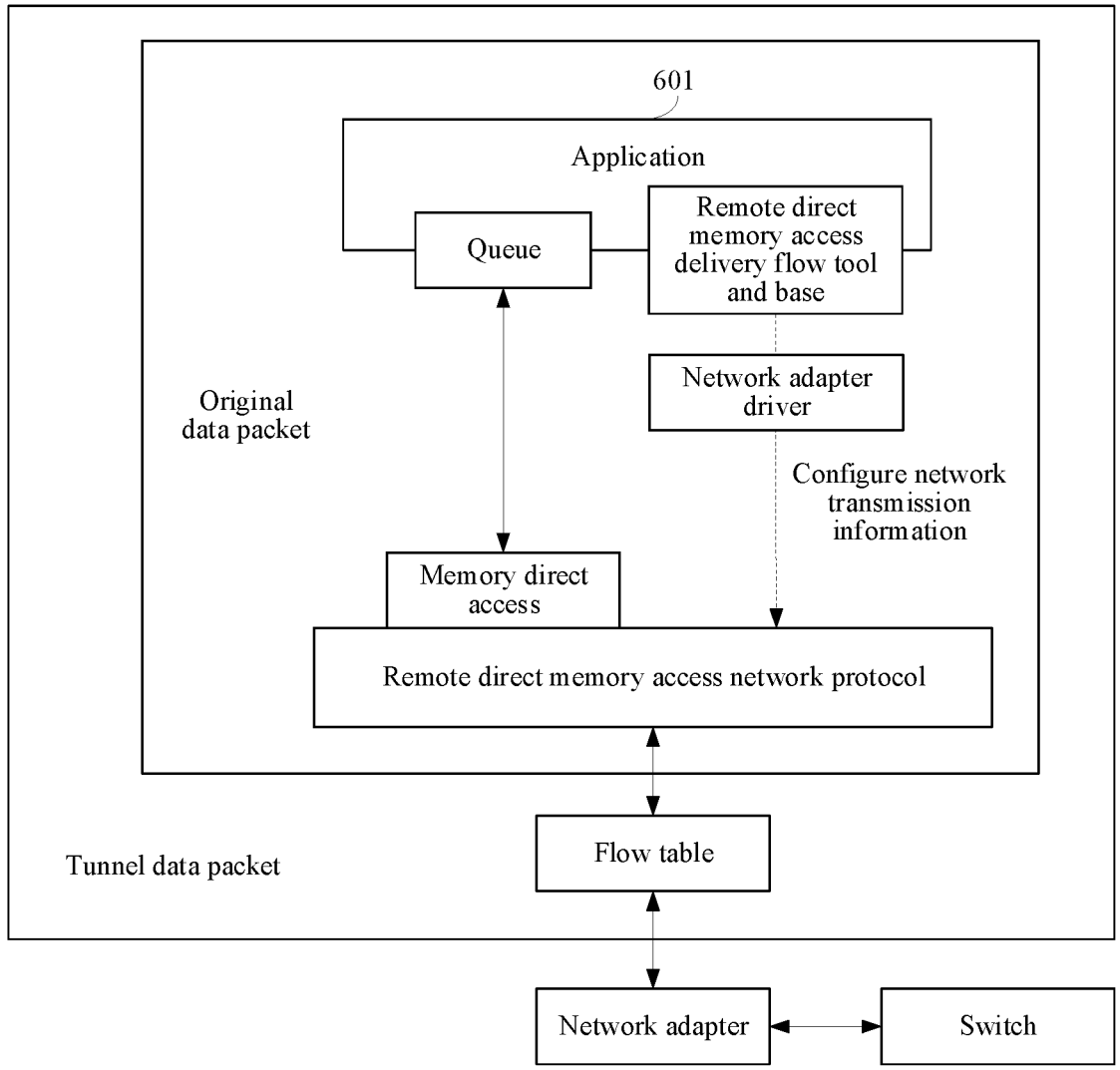
FIG. 6 is a system structural diagram of a data transmission method according to an embodiment of this application.

FIG. 6 is a system structural diagram of a data transmission method according to an embodiment of this application. Referring to FIG. 6, an RDMA application 601 running in a sender virtual machine distributes a flow tool, a base, and a network adapter driver through RDMA, configures network transmission information, such as an IP address, a MAC address, a network adapter port number, and an application layer port number, for to-be-transmitted data, maps the to-be-transmitted data to a payload of an RoCE protocol, and pads the network transmission information into a header corresponding to the RoCE protocol to form an original data packet in which the RoCE protocol is encapsulated. The original data packet is sent to a sender network adapter by using a sender server. When the original data packet successfully matches a flow table, tunnel encapsulation is performed on the original data packet based on the flow table to obtain a tunnel data packet. A network adapter and a switch ensure reliable transmission of data in a network.

In the related art, the sender server delivers a sender flow table to the sender network adapter through learning. Learning means that the sender server parses the original data packet to obtain transmission information such as an IP address, a layer 3 protocol number, and an application layer port number of the original data packet, and generates the sender flow table based on the transmission information. A process of delivering the flow table is: The sender server sends the original data packet to the sender network adapter, and the sender network adapter first performs flow table match. If the match succeeds, tunnel encapsulation is performed on the original data packet, and the data packet obtained after the encapsulation is sent to a network; if the match fails, the sender network adapter returns the original data packet to the sender server for processing. The sender server parses the original data packet to obtain the transmission information such as the IP address, the layer 3 protocol number, and the application layer port number of the original data packet, generates the sender flow table based on the transmission information, and delivers the sender flow table to the sender network adapter. Subsequently, the sender network adapter may match the original data packet with the sender flow table when receiving the original data packet, and forwards a data packet based on the sender flow table.

Figure 7:
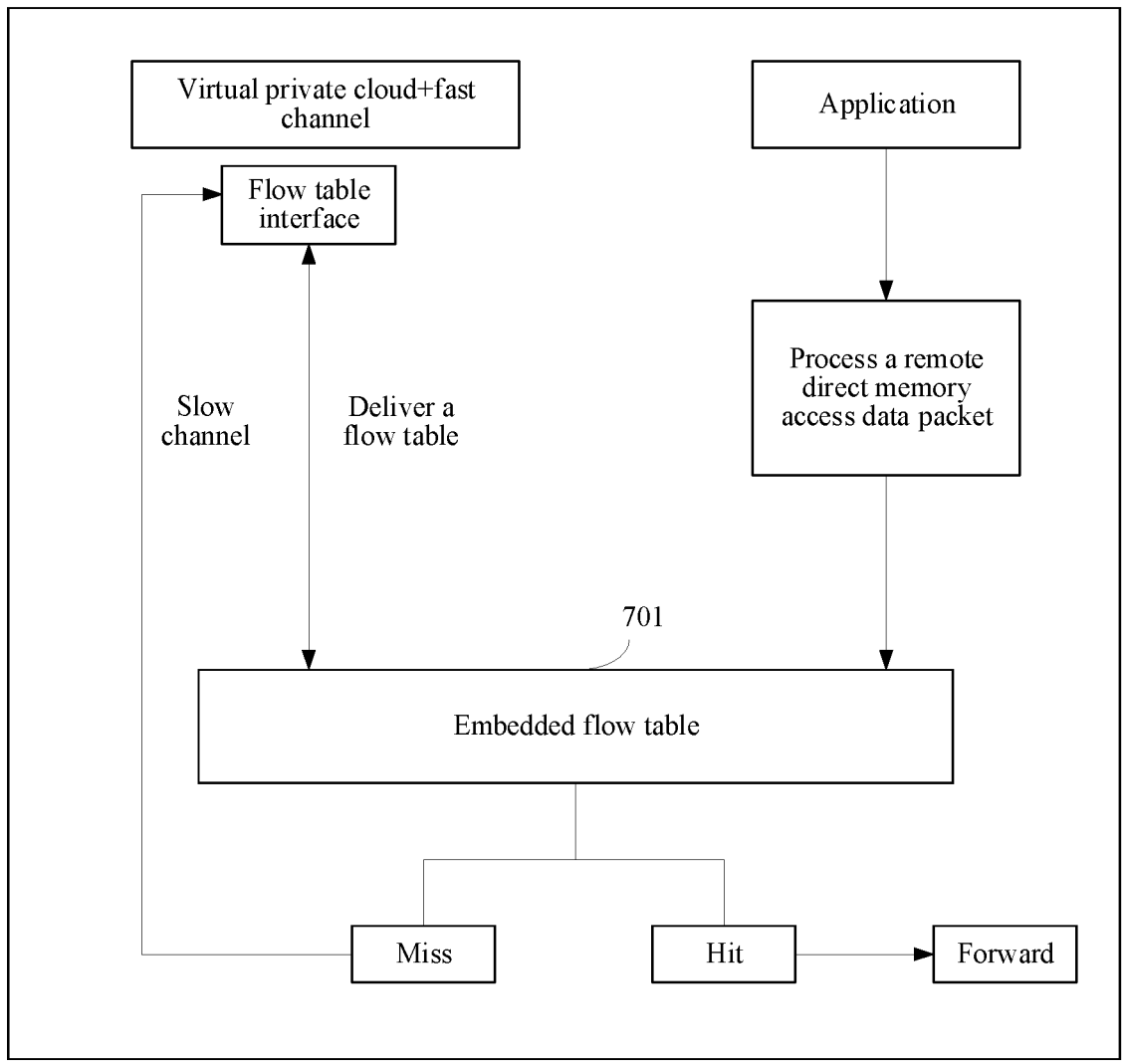
FIG. 7 is a schematic diagram of flow table query according to an embodiment of this application.

As shown in FIG. 7, a fast channel on a virtual private cloud delivers an embedded flow table 701 for a sender network adapter through a flow table interface. Subsequently, flow table query is performed for an RDMA data packet. When a query result is a hit, the sender network adapter may perform an operation based on the flow table; when the query result is a miss, the flow table needs to be forwarded to a slow channel, and the flow table is installed for the sender network adapter through the flow table interface.

However, according to the method provided in this embodiment of this application, when the sender server receives a data transmission request including the original data packet, the sender server establishes the RDMA connection to the receiver server, generates the sender flow table in the process of establishing the RDMA connection, and delivers the sender flow table to the sender network adapter. Therefore, the original data packet is sent to the sender network adapter, and the data packet can successfully match the sender flow table the first time the sender network adapter receives the data packet.

The second address in the original data packet is an address configured by a tenant for a virtual machine, and is used for transmitting data in a virtual network. The virtual network between virtual machines is referred to as an overlay network, and is an inner layer network of a tunneling protocol. The first address in the tunnel data packet is an address of a network adapter on a physical host, is used for transmitting data in a real physical network, is referred to as an underlay network, and is an outer layer network of the tunneling protocol. The overlay network is established above the underlay network. The overlay network and the underlay network are a pair of opposite concepts. Therefore, the inner layer network and the outer layer network can be isolated from each other by using the tunneling protocol.

204. The sender network adapter sends the tunnel data packet to the receiver network adapter corresponding to the first address.

The sender network adapter encapsulates the original data packet to obtain the tunnel data packet, the tunnel data packet carries the first address and the tenant identifier, and the first address includes the address of the receiver network adapter for receiving the original data packet. Therefore, a receiver network adapter can be determined by using the first address. The tenant identifier is used for indicating a tenant on the receiver server corresponding to the receiver network adapter.

The sender network adapter establishes a communication network connection to the receiver network adapter. The sender network adapter sends the tunnel data packet to a communication network. The communication network transmits the tunnel data packet to the receiver network adapter based on the first address. Subsequently, after receiving the tunnel data packet, the receiver network adapter decapsulates the tunnel data packet to obtain the original data packet and the tenant identifier. For a decapsulation process, refer to step 205.

205. The receiver network adapter receives the tunnel data packet sent by the sender network adapter; and when determines that the tunnel data packet successfully matches the receiver flow table, the receiver network adapter decapsulates the tunnel data packet to obtain the original data packet and the tenant identifier, and transmits the original data packet and the tenant identifier to the receiver server.

The receiver network adapter performs flow table query when receiving the tunnel data packet, and decapsulates the tunnel data packet based on the receiver flow table when determining that the tunnel data packet successfully matches the receiver flow table. The tunnel data packet carries the first address. The first address includes a first MAC address and a first IP address of the receiver network adapter. The decapsulating the tunnel data packet includes: acquiring the tenant identifier in the tunnel data packet, and deleting the first MAC address and the first IP address in the tunnel data packet to obtain the original data packet. The receiver network adapter obtains the original data packet and the tenant identifier, and transmits the original data packet and the tenant identifier to the receiver server corresponding to the receiver network adapter.

In some embodiments, the tunnel data packet includes a header and a body, the header includes a first MAC address field, a first IP address field, and a tunneling protocol field, the first IP address field includes an ECN value and a DSCP value, the tunneling protocol field includes a tenant identifier, the body includes a second IP address field and transmission data, and the second IP address field includes a second IP address.

In this case, the foregoing decapsulation process includes: acquiring the tenant identifier in the tunneling protocol field, and deleting the first MAC address field, the first IP address field, and the tunneling protocol field of the tunnel data packet to obtain the original data packet. The original data packet includes a header and a body, the header of the original data packet includes the second IP address field, and the body of the original data packet includes the transmission data. A second MAC address field is added to the header of the original data packet. The second MAC address field includes the second MAC address. The ECN value and the DSCP value are written to the second IP address field.

The second MAC address is obtained by the receiver network adapter by querying a table by using receive end serving system software. The receive end serving system software is software running in the receiver server, and is used for managing data transmission and reception.

The ECN value and the DSCP value in the tunnel data packet are similar to the ECN value and the DSCP value in step 203, and details are not described herein again.

Therefore, in step 203, the ECN value and the DSCP value in the header of the original data packet are copied to the first IP address field of the tunnel data packet; and in step 206, the ECN value and the DSCP value in the header of the tunnel data packet are copied to the second IP address field of the original data packet, thereby implementing flow control of an RDMA network, and resolving a problem of isolation between the RDMA network and the conventional TCP/IP network.

In some embodiments, the tunnel data packet includes a fourth IP address, a first IP address, a tenant identifier, a layer 3 protocol number, and an application layer port number, the fourth IP address is an IP address of the sender network adapter, and the first IP address is an IP address of the receiver network adapter. The fourth IP address, the first IP address, the tenant identifier, the layer 3 protocol number, and the application layer port number in the tunnel data packet may determine a transmission direction of the tunnel data packet. The receiver flow table includes a match, and the match may include a fourth IP address, a first IP address, a tenant identifier, a layer 3 protocol number, and an application layer port number. The fourth IP address, the first IP address, the tenant identifier, the layer 3 protocol number, and the application layer port number in the receiver flow table may determine a transmission direction of a data packet corresponding to the receiver flow table. Therefore, when a parameter of the tunnel data packet is the same as a parameter of the receiver flow table, it is determined that the tunnel data packet successfully matches the receiver flow table.

Figure 8:
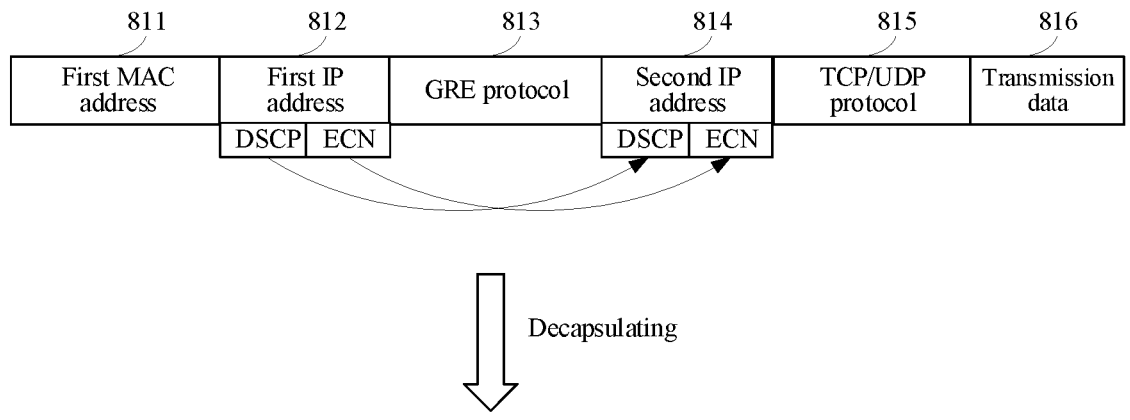
FIG. 8 is a schematic structural diagram of another data packet according to an embodiment of this application.

As shown in FIG. 8, the header of the tunnel data packet includes a first MAC address field 811, a first IP address field 812, and a GRE protocol field 813; and the body of the tunnel data packet includes a second IP address field 814, a TCP/UDP protocol field 815, and a transmission data field 816. The first MAC address field 811 includes a first MAC address. The first IP address field 812 includes a first IP address, a DSCP value, and an ECN value. The GRE protocol field 813 includes a GRE protocol, and the GRE protocol carries a tenant identifier. The second IP address field 814 includes a second IP address. The TCP/UDP protocol field 815 includes a TCP/UDP protocol. The transmission data field 816 includes to-be-transmitted transmission data. The first MAC address field 811, the first IP address field 812, and the GRE protocol field 813 of the tunnel data packet are deleted, a second MAC address field is added, and the DSCP value and the ECN value in the first IP address field 812 are copied to the second IP address field to obtain an original data packet. As shown in FIG. 8, a header of the original data packet includes a second MAC address field 821, a second IP address field 822, and a TCP/UDP protocol field 823; and a body of the original data packet includes a transmission data field 824. The second MAC address field 821 includes a second MAC address. The second IP address field 822 includes a second IP address, a DSCP value, and an ECN value.

Figure 9:
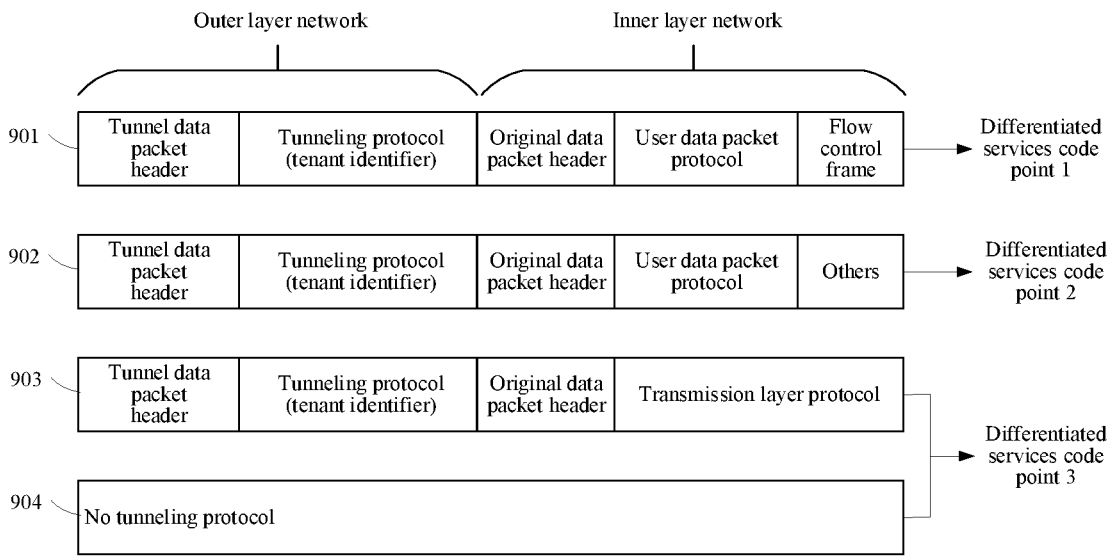
FIG. 9 is a schematic structural diagram of another data packet according to an embodiment of this application.

FIG. 9 shows four types of data packets in a network. Referring to FIG. 9, a data packet 901 is an RoCE flow control data packet, a data packet 902 is an RoCE data packet, a data packet 903 is a TCP/IP packet carrying a tunneling protocol (a non-RoCE data packet), and a data packet 904 is a TCP/IP packet not carrying a tunneling protocol (a non-RoCE data packet). A sender server adds different DSCP values to different types of data packets to identify the different types of data packets. A switch on a network distinguishes between data packets by using the DSCP values, to implement flow control.

206. The receiver server delivers the original data packet to a tenant corresponding to the tenant identifier in response to that the original data packet and the tenant identifier are acquired.

There are a plurality of tenants in the receiver server. The receiver server delivers the original data packet to the tenant corresponding to the tenant identifier when acquiring the original data packet and the tenant identifier.

The original data packet carries a second address. The second address includes a second MAC address and a second IP address of the receiver virtual machine. The receiver server configures a plurality of virtual machines for the tenant, and the plurality of virtual machines form a virtual network. The second address is used for indicating any one of the plurality of virtual machines. The receiver server determines the tenant corresponding to the tenant identifier when acquiring the original data packet and the tenant identifier, and sends the original data packet to the virtual network of the tenant. The virtual network sends the original data packet to any receiver virtual machine corresponding to the second address. The tenant may receive the original data packet based on the receiver virtual machine.

Figure 10:
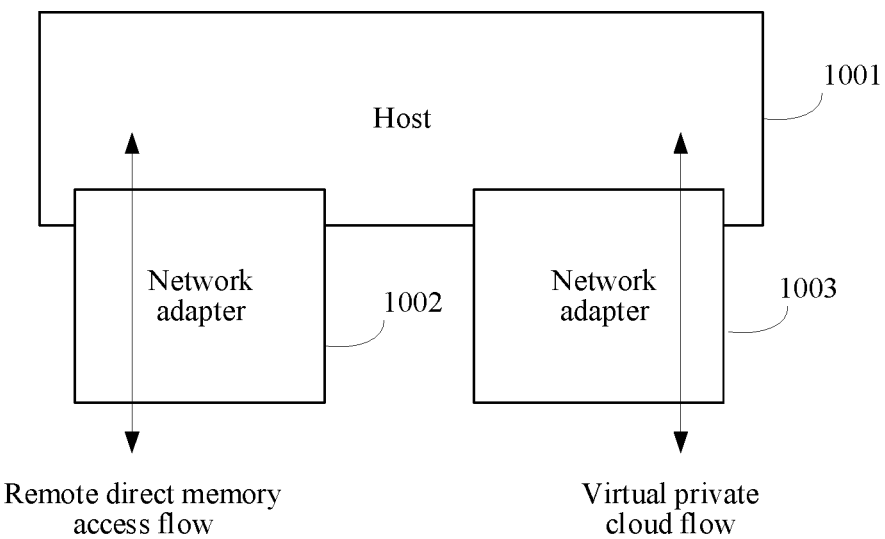
FIG. 10 is a schematic structural diagram of configuring two network adapters according to the related art.

As shown in FIG. 10, in the related art, to implement both an RDMA technology and a VPC technology, two network adapters are configured on one host 1001. A network adapter 1002 is configured to implement an RDMA network, and a network adapter 1003 is configured to implement a VPC network. A server with two network adapters can manage data of the RDMA network and the VPC network. Although an RDMA data packet and a TCP/IP data packet can be isolated physically, a plurality of tenants on the RDMA network still cannot be isolated. In addition, if a manner of two network adapters is used, in addition to the network adapters, quantities of wires, switches, and the like all need to be two. Therefore, wiring is complex, and configuration costs and operating costs are high.

According to the method provided in this embodiment of this application, a sender network adapter acquires an original data packet, a first address, and a tenant identifier; performs tunnel encapsulation on the original data packet based on the first address and the tenant identifier to obtain a tunnel data packet; and sends the tunnel data packet to a receiver network adapter corresponding to the first address. The receiver network adapter decapsulates, in response to that the tunnel data packet is received, the tunnel data packet to obtain the original data packet and the tenant identifier; and transmits the original data packet and the tenant identifier to a receiver server. The receiver server delivers the original data packet to a tenant corresponding to the tenant identifier. A VPC network includes a plurality of tenants, and each tenant may receive and send a data packet over an RDMA network. In the RDMA network, tunnel encapsulation is performed on data packets of one or more tenants in the VPC network according to the method provided in this embodiment of this application, and the tenants are distinguished from each other by using tenant identifiers. Data of the tenants in the VPC network is isolated and transmitted in the RDMA network. In this case, each tenant can acquire a data packet only of the tenant. For example, a tenant 1 can acquire a data packet of the tenant 1, but cannot acquire a data packet of a tenant 2. In this way, data of each tenant cannot be acquired by another tenant, thereby ensuring data security.

In addition, according to the method provided in this embodiment of this application, infrastructure of a public cloud network does not need to be changed, and an RDMA technology can be presented to a tenant on the VPC network without increasing hardware costs. The VPC network and the RDMA network are combined, thereby resolving a problem of isolation of a plurality of tenants. The method can meet a requirement of a VPC tenant on deploying applications such as machine learning, big data, and scientific computing, and has low latency.

In addition, a problem of flow control of the RDMA network is resolved by copying an ECN value and a DSCP value between the original data packet and the tunnel data packet. In addition, a data packet is identified by using the DSCP value, so that an RDMA data packet can be distinguished from a conventional TCP/IP data packet, thereby resolving a problem of isolation between the RDMA network and a conventional TCP/IP network.

In addition, a flow table is delivered to a network adapter in a process of establishing an RDMA connection, so that it can be ensured that the flow table is successfully downloaded during establishment of the RDMA connection, thereby effectively avoiding problems such as an error of an RDMA data packet state and disorder.

In addition, in the related art, a flow table is classified based on per flow (a pair of IP addresses and a pair of port numbers). A field in the flow table includes a source IP address, a destination IP address, a destination port number, and a source port number. A server generates a flow table in a per flow manner, and delivers the flow table to a network adapter. The network adapter queries a flow table corresponding to a destination port number and a source port number based on a source IP address and a destination IP address in the per flow manner. However, in this embodiment of this application, a flow table is classified based on per destination (a pair of IP addresses and a destination port number). A field in the flow table includes a source IP address, a destination IP address, and a destination port number. A server generates a flow table in a per destination manner, and delivers the flow table to a network adapter. The network adapter queries a flow table corresponding to a destination port number based on a source IP address and a destination IP address in the per destination manner. Therefore, according to the method provided in this embodiment of this application, classification is performed based on only the destination port number without considering the source port number. In this way, classification categories are reduced, a flow table specification is reduced, a query speed for the flow table is faster, and latency is lower.

Figure 11:
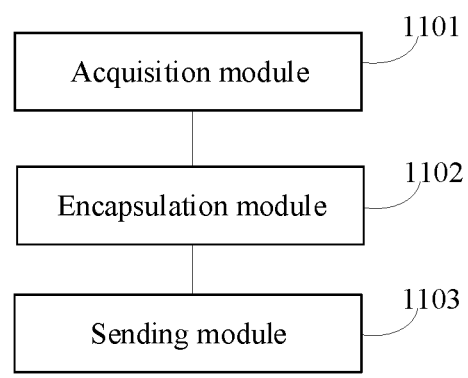
FIG. 11 is a schematic structural diagram of a data transmission apparatus according to an embodiment of this application.

FIG. 11 is a schematic structural diagram of a data transmission apparatus according to an embodiment of this application. The apparatus is applicable to a sender network adapter. Referring to FIG. 11, the apparatus includes:

an acquisition module 1101, configured to acquire an original data packet, a first address, and a tenant identifier, the first address including an address of a receiver network adapter for receiving the original data packet, and the tenant identifier being used for indicating a corresponding tenant on a receiver server;

an encapsulation module 1102, configured to perform tunnel encapsulation on the original data packet based on the first address and the tenant identifier to obtain a tunnel data packet; and a sending module 1103, configured to: send the tunnel data packet to the receiver network adapter corresponding to the first address, the receiver network adapter being configured to decapsulate, in response to that the tunnel data packet is received, the tunnel data packet to obtain the original data packet and the tenant identifier; and transmit the original data packet and the tenant identifier to a receiver server, the receiver server being configured to deliver the original data packet to a tenant corresponding to the tenant identifier.

According to the apparatus provided in this embodiment of this application, an original data packet, a first address, and a tenant identifier are acquired; tunnel encapsulation is performed on the original data packet based on the first address and the tenant identifier to obtain a tunnel data packet; and the tunnel data packet is sent to a receiver network adapter corresponding to the first address. The receiver network adapter decapsulates, in response to that the tunnel data packet is received, the tunnel data packet to obtain the original data packet and the tenant identifier; and transmits the original data packet and the tenant identifier to a receiver server, the receiver server being configured to deliver the original data packet to a tenant corresponding to the tenant identifier. Therefore, by performing tunnel encapsulation, tenants may be distinguished from each other based on tenant identifiers, and data of each tenant in a public cloud can be isolated, thereby ensuring data security.

Figure 12:
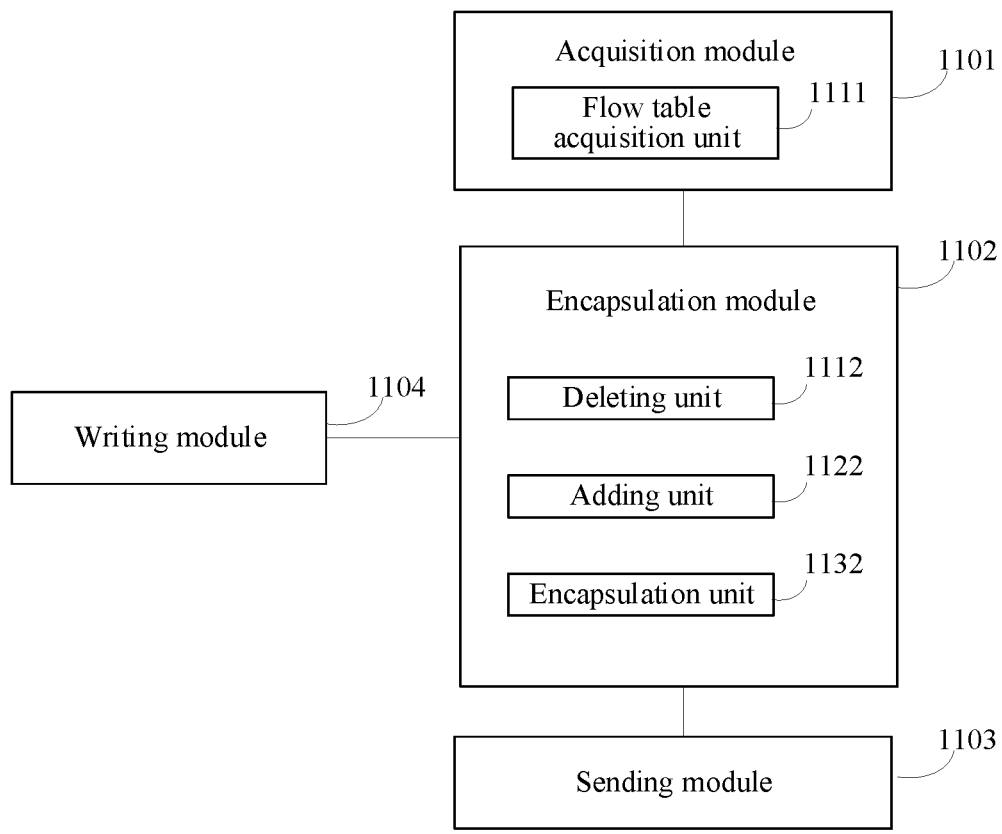
FIG. 12 is a schematic structural diagram of another data transmission apparatus according to an embodiment of this application.

In some embodiments, referring to FIG. 12, the first address includes a first Media Access Control (MAC) address and a first internet protocol (IP) address of the receiver network adapter, the original data packet carries a second address, the second address includes an address of a receiver virtual machine, the address of the receiver virtual machine includes a second MAC address and a second IP address, and the encapsulation module 1102 includes:

a deleting unit 1112, configured to delete the second MAC address in the original data packet; and an adding unit 1122, configured to add the first MAC address, the first IP address, and the tenant identifier to obtain the tunnel data packet.

In some embodiments, the original data packet includes a header and a body, the header of the original data packet includes a second MAC address field and a second IP address field, the second MAC address field includes the second MAC address, the second IP address field includes the second IP address, an explicit congestion notification (ECN) value, and a differentiated services code point (DSCP) value, and the body of the original data packet includes transmission data. The tunnel data packet includes a header and a body, the header of the tunnel data packet includes a first MAC address field, a first IP address field, and a tunneling protocol field, the first MAC address field includes the first MAC address, the first IP address field includes the first IP address, the tunneling protocol field includes the tenant identifier, and the body of the tunnel data packet includes the second IP address field and the transmission data. The apparatus further includes:

a writing module 1104, configured to write the ECN value in the second IP address field and the DSCP value in the second IP address field to the first IP address field.

In some embodiments, the sender network adapter is a network adapter supporting RoCE, and the acquisition module 1101 includes:

a flow table acquisition unit 1111, configured to acquire a sender flow table and the original data packet that are delivered by a sender server, the sender flow table including the first address and the tenant identifier; and the sender server is configured to: establish a remote direct memory access (RDMA) connection to the receiver server in response to that an original data packet acquired by a sender virtual machine is received, generate the sender flow table in a process of establishing the RDMA connection, deliver the sender flow table to the sender network adapter, and deliver the original data packet to the sender network adapter.

In some embodiments, the encapsulation module 1102 includes:

an encapsulation unit 1132, configured to perform, in response to a determination that the original data packet successfully matches the sender flow table, tunnel encapsulation on the original data packet based on the first address and the tenant identifier to obtain the tunnel data packet.

In some embodiments, the sender flow table further includes a match, the match includes a third IP address, a second IP address, a network adapter physical port number, a layer 3 protocol number, and an application layer port number, the third IP address is an IP address of the sender virtual machine, the second IP address is an IP address of a receiver virtual machine, and the encapsulation unit 1132 is further configured to determine, in response to that a third IP address, a second IP address, a network adapter physical port number, a layer 3 protocol number, and an application layer port number that correspond to the original data packet are the same as the third IP address, the second IP address, the network adapter physical port number, the layer 3 protocol number, and the application layer port number in the match, that the original data packet successfully matches the sender flow table.

Figure 13:
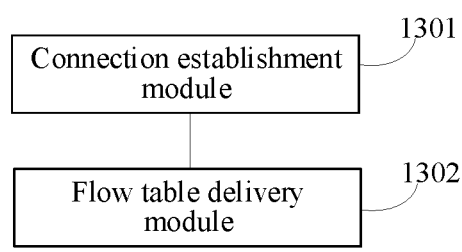
FIG. 13 is a schematic structural diagram of another data transmission apparatus according to an embodiment of this application.

FIG. 13 is a schematic structural diagram of another data transmission apparatus according to an embodiment of this application. The apparatus is applicable to a sender server. The sender server is configured with the sender network adapter in FIG. 11. Referring to FIG. 13, the apparatus includes:

a connection establishment module 1301, configured to establish a remote direct memory access (RDMA) connection to a receiver server in response to that an original data packet is acquired by using a sender virtual machine, the sender virtual machine running in the sender server; and a flow table delivery module 1302, configured to: generate a sender flow table in a process of establishing the RDMA connection, deliver the sender flow table to the sender network adapter, and deliver the original data packet to the sender network adapter.

Figure 14:
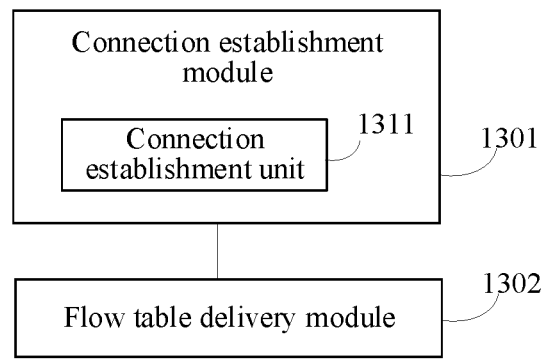
FIG. 14 is a schematic structural diagram of another data transmission apparatus according to an embodiment of this application.

In some embodiments, referring to FIG. 14, the original data packet includes a first differentiated services code point (DSCP) value or a second DSCP value, the first DSCP value being used for indicating that the original data packet is an RDMA data packet, and the second DSCP value being used for indicating that the original data packet is a transmission control protocol/internet protocol (TCP/IP) data packet; and the connection establishment module 1301 includes:

a connection establishment unit 1311, configured to establish the RDMA connection to the receiver server in response to that the original data packet is acquired by using the sender virtual machine and the original data packet includes the first DSCP value.

Figure 15:
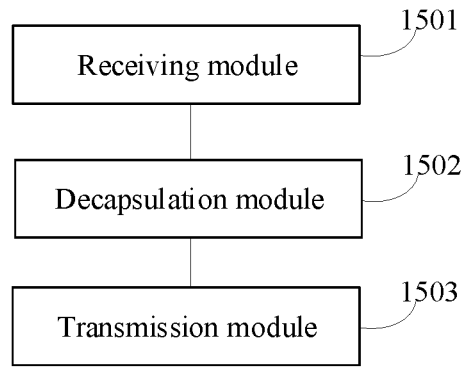
FIG. 15 is a schematic structural diagram of another data transmission apparatus according to an embodiment of this application.

FIG. 15 is a schematic structural diagram of another data transmission apparatus according to an embodiment of this application. The apparatus is applicable to a receiver network adapter. Referring to FIG. 15, the apparatus includes:

- a receiving module 1501, configured to receive a tunnel data packet sent by a sender network adapter, the tunnel data packet being obtained after the sender network adapter performs tunnel encapsulation on an original data packet based on a first address and a tenant identifier, the first address including an address of the receiver network adapter for receiving the original data packet, and the tenant identifier being used for indicating a corresponding tenant on a receiver server;
- a decapsulation module 1502, configured to decapsulate the tunnel data packet to obtain the original data packet and the tenant identifier; and
- a transmission module 1503, configured to transmit the original data packet and the tenant identifier to the receiver server.

Figure 16:
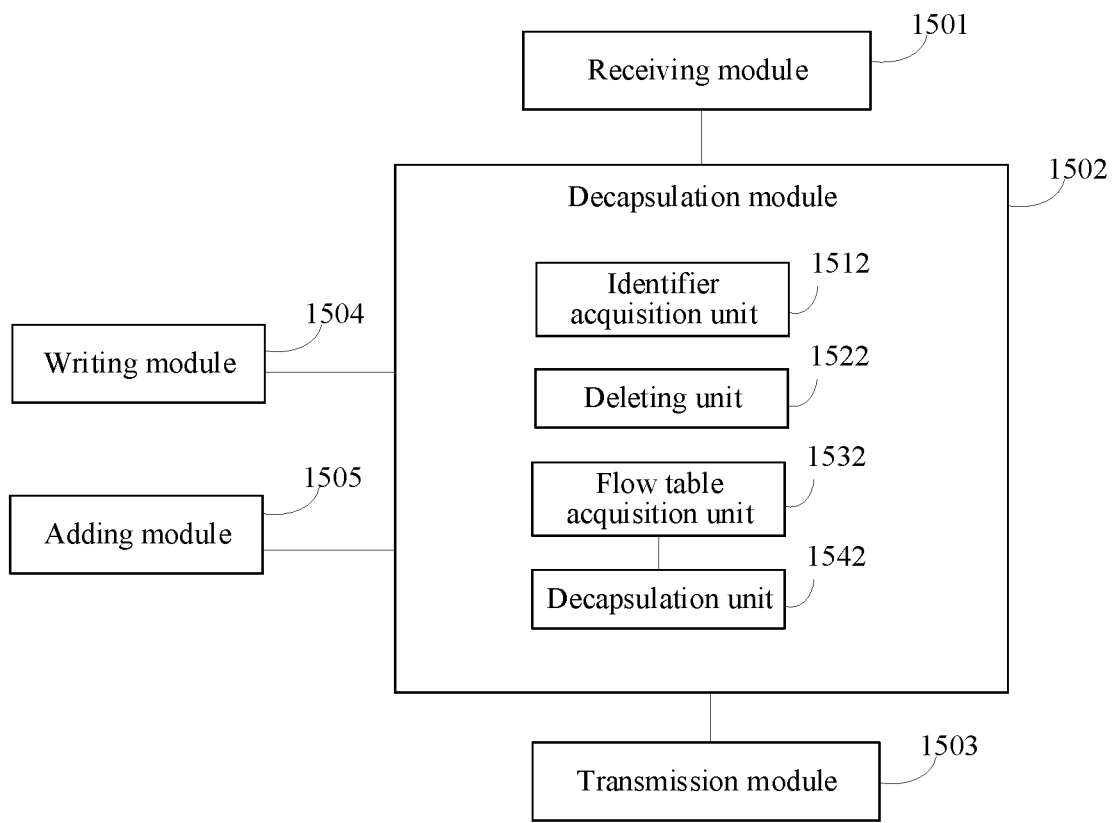
FIG. 16 is a schematic structural diagram of another data transmission apparatus according to an embodiment of this application.

In some embodiments, referring to FIG. 16, the tunnel data packet includes the first address and the tenant identifier, the address of the receiver network adapter includes a first Media Access Control (MAC) address and a first internet protocol (IP) address, and the decapsulation module 1502 includes:

- an identifier acquisition unit 1512, configured to acquire the tenant identifier in the tunnel data packet; and
- a deleting unit 1522, configured to delete the first MAC address and the first IP address in the tunnel data packet to obtain the original data packet.

In some embodiments, the tunnel data packet includes a header and a body, the header of the tunnel data packet includes a first MAC address field, a first IP address field, and a tunneling protocol field, the first MAC address field includes the first MAC address, the first IP address field includes the first IP address, an explicit congestion notification (ECN) value, and a differentiated services code point (DSCP) value, the tunneling protocol field includes the tenant identifier, the body of the tunnel data packet includes a second IP address field and transmission data, the second IP address field includes a second IP address, and the second IP address is an IP address of a receiver virtual machine.

The original data packet includes a header and a body, the header of the original data packet includes the second IP address field, and the body of the original data packet includes the transmission data. The apparatus further includes:

- a writing module 1504, configured to write the ECN value in the first IP address field and the DSCP value in the first IP address field to the second IP address field; and
- an adding module 1505, configured to add a second MAC address field to the header of the original data packet, the second MAC address field including a second MAC address, and the second MAC address being a MAC address of the receiver virtual machine.

In some embodiments, the receiver network adapter is a network adapter supporting RoCE, and the decapsulation module 1502 includes:

- a flow table acquisition unit 1532, configured to acquire a receiver flow table delivered by the receiver server, the receiver server being configured to: establish a remote direct memory access (RDMA) connection to a sender server, generate the receiver flow table in a process of establishing the RDMA connection, and deliver the receiver flow table to the receiver network adapter; and
- a decapsulation unit 1542, configured to decapsulate, in response to that the tunnel data packet successfully matches the receiver flow table, the tunnel data packet to obtain the original data packet and the tenant identifier.

In some embodiments, the receiver flow table includes a match, the match includes a fourth IP address, a first IP address, a tenant identifier, a layer 3 protocol number, and an application layer port number, the fourth IP address is an IP address of the sender network adapter, the first IP address is an IP address of the receiver network adapter, the tunnel data packet includes a fourth IP address, a first IP address, a tenant identifier, a layer 3 protocol number, and an application layer port number. The decapsulation unit 1542 is further configured to determine, in response to that the fourth IP address, the first IP address, the tenant identifier, the layer 3 protocol number, and the application layer port number in the tunnel data packet are the same as the fourth IP address, the first IP address, the tenant identifier, the layer 3 protocol number, and the application layer port number in the match, that the tunnel data packet successfully matches the receiver flow table.

Figure 17:
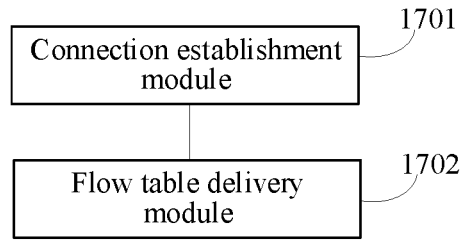
FIG. 17 is a schematic structural diagram of another data transmission apparatus according to an embodiment of this application.

FIG. 17 is a schematic structural diagram of another data transmission apparatus according to an embodiment of this application. The apparatus is applicable to a receiver server. The receiver server is configured with the sender network adapter in FIG. 15. Referring to FIG. 17, the apparatus includes:

- a connection establishment module 1701, configured to establish a remote direct memory access (RDMA) connection to a sender server by using a receiver virtual machine, the receiver virtual machine running in the receiver server; and
- a flow table delivery module 1702, configured to: generate a receiver flow table in a process of establishing the RDMA connection, and deliver the receiver flow table to the receiver network adapter.

Figure 18:
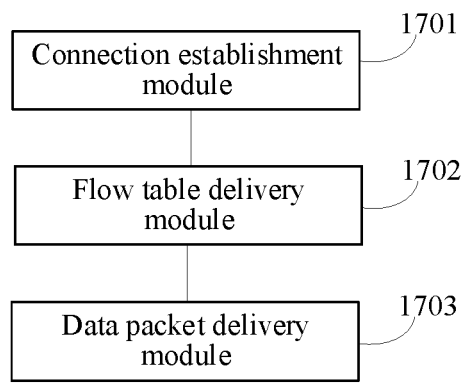
FIG. 18 is a schematic structural diagram of another data transmission apparatus according to an embodiment of this application.

In some embodiments, referring to FIG. 18, the apparatus further includes:

- a data packet delivery module 1703, configured to deliver an original data packet to a tenant corresponding to a tenant identifier in response to that the original data packet and the tenant identifier that are sent by the receiver network adapter are acquired.

When the data transmission apparatus provided in the foregoing embodiment transmits data, division of the foregoing functional modules is merely used as an example for description. In actual application, the foregoing functions may be assigned to different functional modules for implementation as required. That is, an inner structure of the receiver server is divided into different functional modules to implement some or all of the functions described above. In addition, the data transmission apparatus provided in the foregoing embodiment and the data transmission method embodiment belong to the same concept. For a specific implementation process of the apparatus, refer to the method embodiment, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 19:
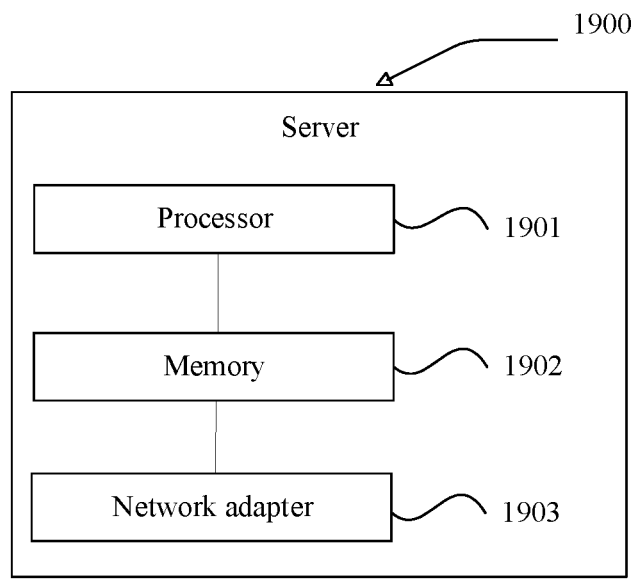
FIG. 19 is a schematic structural diagram of a server according to an embodiment of this application.

FIG. 19 is a schematic structural diagram of a server according to an embodiment of this application. The server 1900 may vary greatly due to different configurations or performance, and may include one or more processors (CPUs) 1901, one or more memories 1902, and one or more network adapters 1903. The memory 1902 stores at least one program code. The at least one program code is loaded and executed by the processor 1901 to implement the method performed by the server and provided in the foregoing method embodiment. The network adapter 1903 is configured to implement the method performed by the network adapter and provided in the foregoing method embodiment. Certainly, the device can also have a wired or wireless network interface, a keyboard, an input/output interface and other components to facilitate input/output. The device can also include other components for implementing device functions. Details are not described herein again.

An embodiment of this application further provides a sender network adapter configured to transmit data. The sender network adapter is configured to implement the following operations:
  acquiring an original data packet, a first address, and a tenant identifier, the first address including an address of a receiver network adapter for receiving the original data packet, and the tenant identifier being used for indicating a corresponding tenant on a receiver server;
  performing tunnel encapsulation on the original data packet based on the first address and the tenant identifier to obtain a tunnel data packet; and
  sending the tunnel data packet to the receiver network adapter corresponding to the first address.

In some embodiments, the first address includes a first Media Access Control (MAC) address and a first internet protocol (IP) address of the receiver network adapter, the original data packet carries a second address, the second address includes an address of a receiver virtual machine, the address of the receiver virtual machine includes a second MAC address and a second IP address. The sender network adapter is further configured to implement the following operations:
  deleting the second MAC address of the original data packet, and adding the first MAC address, the first IP address, and the tenant identifier to obtain the tunnel data packet.

In some embodiments, the original data packet includes a header and a body, the header of the original data packet includes a second MAC address field and a second IP address field, the second MAC address field includes the second MAC address, the second IP address field includes the second IP address, an explicit congestion notification (ECN) value, and a differentiated services code point (DSCP) value, and the body of the original data packet includes transmission data.

The tunnel data packet includes a header and a body, the header of the tunnel data packet includes a first MAC address field, a first IP address field, and a tunneling protocol field, the first MAC address field includes the first MAC address, the first IP address field includes the first IP address, the tunneling protocol field includes the tenant identifier, and the body of the tunnel data packet includes the second IP address field and the transmission data. The sender network adapter is further configured to implement the following operation:
  writing the ECN value in the second IP address field and the DSCP value in the second IP address field to the first IP address field.

In some embodiments, the sender network adapter is a network adapter supporting RDMA over Converged Ethernet (RoCE), and the sender network adapter is further configured to implement the following operation:
  acquiring a sender flow table and the original data packet that are delivered by a sender server, the sender flow table including the first address and the tenant identifier; and
  the sender server is configured to: establish a remote direct memory access (RDMA) connection to the receiver server in response to that an original data packet acquired by a sender virtual machine is received, generate the sender flow table in a process of establishing the RDMA connection, deliver the sender flow table to the sender network adapter, and deliver the original data packet to the sender network adapter.

In some embodiments, the sender network adapter is further configured to implement the following operation:
  performing, in response to that the original data packet successfully matches the sender flow table, tunnel encapsulation on the original data packet based on the first address and the tenant identifier to obtain the tunnel data packet.

In some embodiments, the sender flow table further includes a match, the match includes a third IP address, a second IP address, a network adapter physical port number, a layer 3 protocol number, and an application layer port number, the third IP address is an IP address of the sender virtual machine, the second IP address is an IP address of a receiver virtual machine. The sender network adapter is further configured to implement the following operation:
  determining, in response to that a third IP address, a second IP address, a network adapter physical port number, a layer 3 protocol number, and an application layer port number that correspond to the original data packet are the same as the third IP address, the second IP address, the network adapter physical port number, the layer 3 protocol number, and the application layer port number in the match, that the original data packet successfully matches the sender flow table.

An embodiment of this application further provides a receiver network adapter configured to transmit data. The receiver network adapter is configured to implement the following operations in a data transmission method:
  receiving a tunnel data packet sent by a sender network adapter, the tunnel data packet being obtained after the sender network adapter performs tunnel encapsulation on an original data packet based on a first address and a tenant identifier, the first address including an address of the receiver network adapter, and the tenant identifier being used for indicating a corresponding tenant on a receiver server;
  decapsulating the tunnel data packet to obtain the original data packet and the tenant identifier; and
  transmitting the original data packet and the tenant identifier to the receiver server.

In some embodiments, the tunnel data packet includes the first address and the tenant identifier, the address of the receiver network adapter includes a first Media Access Control (MAC) address and a first internet protocol (IP)

address, and the receiver network adapter is further configured to implement the following operations:

acquiring the tenant identifier in the tunnel data packet; and deleting the first MAC address and the first IP address in the tunnel data packet to obtain the original data packet.

In some embodiments, the tunnel data packet includes a header and a body, the header of the tunnel data packet includes a first MAC address field, a first IP address field, and a tunneling protocol field, the first MAC address field includes the first MAC address, the first IP address field includes the first IP address, an explicit congestion notification (ECN) value, and a differentiated services code point (DSCP) value, the tunneling protocol field includes the tenant identifier, the body of the tunnel data packet includes a second IP address field and transmission data, the second IP address field includes a second IP address, and the second IP address is an IP address of a receiver virtual machine.

The original data packet includes a header and a body, the header of the original data packet includes the second IP address field, and the body of the original data packet includes the transmission data. The receiver network adapter is further configured to implement the following operations:

writing the ECN value in the first IP address field and the DSCP value in the first IP address field to the second IP address field; and adding a second MAC address field to the header of the original data packet, the second MAC address field including a second MAC address, and the second MAC address being a MAC address of the receiver virtual machine.

In some embodiments, the receiver network adapter is a network adapter supporting RDMA over Converged Ethernet (RoCE), and the receiver network adapter is further configured to implement the following operations:

acquiring a receiver flow table delivered by the receiver server, the receiver server being configured to: establish a remote direct memory access (RDMA) connection to a sender server, generating the receiver flow table in a process of establishing the RDMA connection, and delivering the receiver flow table to the receiver network adapter; and decapsulating, in response to that the tunnel data packet successfully matches the receiver flow table, the tunnel data packet to obtain the original data packet and the tenant identifier.

In some embodiments, the receiver flow table includes a match, the match includes a fourth IP address, a first IP address, a tenant identifier, a layer 3 protocol number, and an application layer port number, the fourth IP address is an IP address of the sender network adapter, the first IP address is an IP address of the receiver network adapter, the tunnel data packet includes a fourth IP address, a first IP address, a tenant identifier, a layer 3 protocol number, and an application layer port number. The receiver network adapter is further configured to implement the following operation:

determining, in response to that the fourth IP address, the first IP address, the tenant identifier, the layer 3 protocol number, and the application layer port number in the tunnel data packet are the same as the fourth IP address, the first IP address, the tenant identifier, the layer 3 protocol number, and the application layer port number in the match, that the tunnel data packet successfully matches the receiver flow table.

An embodiment of this application further provides a computer-readable storage medium. The computer-readable storage medium stores at least one program code. The at least one program code is executed by a sender network adapter to implement the following operations in a data transmission method:

acquiring an original data packet, a first address, and a tenant identifier, the first address including an address of a receiver network adapter for receiving the original data packet, and the tenant identifier being used for indicating a corresponding tenant on a receiver server;

performing tunnel encapsulation on the original data packet based on the first address and the tenant identifier to obtain a tunnel data packet; and sending the tunnel data packet to the receiver network adapter corresponding to the first address.

In some embodiments, the first address includes a first Media Access Control (MAC) address and a first internet protocol (IP) address of the receiver network adapter, the original data packet carries a second address, the second address includes an address of a receiver virtual machine, the address of the receiver virtual machine includes a second MAC address and a second IP address. The at least one program code is executed by the sender network adapter to implement the following operation:

deleting the second MAC address of the original data packet, and adding the first MAC address, the first IP address, and the tenant identifier to obtain the tunnel data packet.

In some embodiments, the original data packet includes a header and a body, the header of the original data packet includes a second MAC address field and a second IP address field, the second MAC address field includes the second MAC address, the second IP address field includes the second IP address, an explicit congestion notification (ECN) value, and a differentiated services code point (DSCP) value, and the body of the original data packet includes transmission data.

The tunnel data packet includes a header and a body, the header of the tunnel data packet includes a first MAC address field, a first IP address field, and a tunneling protocol field, the first MAC address field includes the first MAC address, the first IP address field includes the first IP address, the tunneling protocol field includes the tenant identifier, and the body of the tunnel data packet includes the second IP address field and the transmission data. The at least one program code is executed by the sender network adapter to implement the following operation:

writing the ECN value in the second IP address field and the DSCP value in the second IP address field to the first IP address field.

In some embodiments, the sender network adapter is a network adapter supporting RDMA over Converged Ethernet (RoCE). The at least one program code is executed by the sender network adapter to implement the following operation:

acquiring a sender flow table and the original data packet that are delivered by a sender server, the sender flow table including the first address and the tenant identifier; and the sender server is configured to: establish a remote direct memory access (RDMA) connection to the receiver server in response to that an original data packet acquired by a sender virtual machine is received, generate the sender flow table in a process of establishing the RDMA connection, deliver the sender flow table to the sender network adapter, and deliver the original data packet to the sender network adapter.

In some embodiments, the at least one program code is executed by the sender network adapter to implement the following operation:

performing, in response to that the original data packet successfully matches the sender flow table, tunnel encapsulation on the original data packet based on the first address and the tenant identifier to obtain the tunnel data packet.

In some embodiments, the sender flow table further includes a match, the match includes a third IP address, a second IP address, a network adapter physical port number, a layer 3 protocol number, and an application layer port number, the third IP address is an IP address of the sender virtual machine, the second IP address is an IP address of a receiver virtual machine. The at least one program code is executed by the sender network adapter to implement the following operation:

determining, in response to that a third IP address, a second IP address, a network adapter physical port number, a layer 3 protocol number, and an application layer port number that correspond to the original data packet are the same as the third IP address, the second IP address, the network adapter physical port number, the layer 3 protocol number, and the application layer port number in the match, that the original data packet successfully matches the sender flow table.

An embodiment of this application further provides a computer-readable storage medium. The computer-readable storage medium stores at least one program code. The at least one program code is executed by a receiver network adapter to implement the following operations in a data transmission method:

receiving a tunnel data packet sent by a sender network adapter, the tunnel data packet being obtained after the sender network adapter performs tunnel encapsulation on an original data packet based on a first address and a tenant identifier, the first address including an address of the receiver network adapter, and the tenant identifier being used for indicating a corresponding tenant on a receiver server;

decapsulating the tunnel data packet to obtain the original data packet and the tenant identifier; and transmitting the original data packet and the tenant identifier to the receiver server.

In some embodiments, the tunnel data packet includes the first address and the tenant identifier, the address of the receiver network adapter includes a first Media Access Control (MAC) address and a first internet protocol (IP) address. The at least one program code is executed by the receiver network adapter to implement the following operations:

acquiring the tenant identifier in the tunnel data packet; and deleting the first MAC address and the first IP address in the tunnel data packet to obtain the original data packet.

In some embodiments, the tunnel data packet includes a header and a body, the header of the tunnel data packet includes a first MAC address field, a first IP address field, and a tunneling protocol field, the first MAC address field includes the first MAC address, the first IP address field includes the first IP address, an explicit congestion notification (ECN) value, and a differentiated services code point (DSCP) value, the tunneling protocol field includes the tenant identifier, the body of the tunnel data packet includes a second IP address field and transmission data, the second IP address field includes a second IP address, and the second IP address is an IP address of a receiver virtual machine.

The original data packet includes a header and a body, the header of the original data packet includes the second IP address field, and the body of the original data packet includes the transmission data. The at least one program code is executed by the receiver network adapter to implement the following operations:

writing the ECN value in the first IP address field and the DSCP value in the first IP address field to the second IP address field; and adding a second MAC address field to the header of the original data packet, the second MAC address field including a second MAC address, and the second MAC address being a MAC address of the receiver virtual machine.

In some embodiments, the receiver network adapter is a network adapter supporting RDMA over Converged Ethernet (RoCE). The at least one program code is executed by the receiver network adapter to implement the following operations:

acquiring a receiver flow table delivered by the receiver server, the receiver server being configured to: establish a remote direct memory access (RDMA) connection to a sender server, generating the receiver flow table in a process of establishing the RDMA connection, and delivering the receiver flow table to the receiver network adapter; and decapsulating, in response to that the tunnel data packet successfully matches the receiver flow table, the tunnel data packet to obtain the original data packet and the tenant identifier.

In some embodiments, the receiver flow table includes a match, the match includes a fourth IP address, a first IP address, a tenant identifier, a layer 3 protocol number, and an application layer port number, the fourth IP address is an IP address of the sender network adapter, the first IP address is an IP address of the receiver network adapter, the tunnel data packet includes a fourth IP address, a first IP address, a tenant identifier, a layer 3 protocol number, and an application layer port number. The at least one program code is executed by the receiver network adapter to implement the following operation:

determining, in response to that the fourth IP address, the first IP address, the tenant identifier, the layer 3 protocol number, and the application layer port number in the tunnel data packet are the same as the fourth IP address, the first IP address, the tenant identifier, the layer 3 protocol number, and the application layer port number in the match, that the tunnel data packet successfully matches the receiver flow table.

An embodiment of this application further provides a computer program. The computer program includes at least one program code. The at least one program code is executed by a sender network adapter to implement the following operations in a data transmission method:

acquiring an original data packet, a first address, and a tenant identifier, the first address including an address of a receiver network adapter for receiving the original data packet, and the tenant identifier being used for indicating a corresponding tenant on a receiver server;

performing tunnel encapsulation on the original data packet based on the first address and the tenant identifier to obtain a tunnel data packet; and sending the tunnel data packet to the receiver network adapter corresponding to the first address.

In some embodiments, the first address includes a first Media Access Control (MAC) address and a first internet protocol (IP) address of the receiver network adapter, the original data packet carries a second address, the second address includes an address of a receiver virtual machine, the address of the receiver virtual machine includes a second MAC address and a second IP address. The at least one program code is executed by the sender network adapter to implement the following operations:

deleting the second MAC address of the original data packet, and adding the first MAC address, the first IP address, and the tenant identifier to obtain the tunnel data packet.

In some embodiments, the original data packet includes a header and a body, the header of the original data packet includes a second MAC address field and a second IP address field, the second MAC address field includes the second MAC address, the second IP address field includes the second IP address, an explicit congestion notification (ECN) value, and a differentiated services code point (DSCP) value, and the body of the original data packet includes transmission data.

The tunnel data packet includes a header and a body, the header of the tunnel data packet includes a first MAC address field, a first IP address field, and a tunneling protocol field, the first MAC address field includes the first MAC address, the first IP address field includes the first IP address, the tunneling protocol field includes the tenant identifier, and the body of the tunnel data packet includes the second IP address field and the transmission data. The at least one program code is executed by the sender network adapter to implement the following operation:

writing the ECN value in the second IP address field and the DSCP value in the second IP address field to the first IP address field.

In some embodiments, the sender network adapter is a network adapter supporting RDMA over Converged Ethernet (RoCE). The at least one program code is executed by the sender network adapter to implement the following operation:

acquiring a sender flow table and the original data packet that are delivered by a sender server, the sender flow table including the first address and the tenant identifier; and the sender server is configured to: establish a remote direct memory access (RDMA) connection to the receiver server in response to that an original data packet acquired by a sender virtual machine is received, generate the sender flow table in a process of establishing the RDMA connection, deliver the sender flow table to the sender network adapter, and deliver the original data packet to the sender network adapter.

In some embodiments, the at least one program code is executed by the sender network adapter to implement the following operation:

performing, in response to that the original data packet successfully matches the sender flow table, tunnel encapsulation on the original data packet based on the first address and the tenant identifier to obtain the tunnel data packet.

In some embodiments, the sender flow table further includes a match, the match includes a third IP address, a second IP address, a network adapter physical port number, a layer 3 protocol number, and an application layer port number, the third IP address is an IP address of the sender virtual machine, the second IP address is an IP address of a receiver virtual machine. The at least one program code is executed by the sender network adapter to implement the following operation:

determining, in response to that a third IP address, a second IP address, a network adapter physical port number, a layer 3 protocol number, and an application layer port number that correspond to the original data packet are the same as the third IP address, the second IP address, the network adapter physical port number, the layer 3 protocol number, and the application layer port number in the match, that the original data packet successfully matches the sender flow table.

An embodiment of this application further provides a computer program. The computer program includes at least one program code. The at least one program code is executed by a receiver network adapter to implement the following operations in a data transmission method:

receiving a tunnel data packet sent by a sender network adapter, the tunnel data packet being obtained after the sender network adapter performs tunnel encapsulation on an original data packet based on a first address and a tenant identifier, the first address including an address of the receiver network adapter, and the tenant identifier being used for indicating a corresponding tenant on a receiver server;

decapsulating the tunnel data packet to obtain the original data packet and the tenant identifier; and transmitting the original data packet and the tenant identifier to the receiver server.

In some embodiments, the tunnel data packet includes the first address and the tenant identifier, the address of the receiver network adapter includes a first Media Access Control (MAC) address and a first internet protocol (IP) address. The at least one program code is executed by the receiver network adapter to implement the following operations:

acquiring the tenant identifier in the tunnel data packet; and deleting the first MAC address and the first IP address in the tunnel data packet to obtain the original data packet.

In some embodiments, the tunnel data packet includes a header and a body, the header of the tunnel data packet includes a first MAC address field, a first IP address field, and a tunneling protocol field, the first MAC address field includes the first MAC address, the first IP address field includes the first IP address, an explicit congestion notification (ECN) value, and a differentiated services code point (DSCP) value, the tunneling protocol field includes the tenant identifier, the body of the tunnel data packet includes a second IP address field and transmission data, the second IP address field includes a second IP address, and the second IP address is an IP address of a receiver virtual machine.

The original data packet includes a header and a body, the header of the original data packet includes the second IP address field, and the body of the original data packet includes the transmission data. The at least one program code is executed by the receiver network adapter to implement the following operations:

writing the ECN value in the first IP address field and the DSCP value in the first IP address field to the second IP address field; and adding a second MAC address field to the header of the original data packet, the second MAC address field including a second MAC address, and the second MAC address being a MAC address of the receiver virtual machine.

In some embodiments, the receiver network adapter is a network adapter supporting RDMA over Converged Ethernet (RoCE). The at least one program code is executed by the receiver network adapter to implement the following operations:

acquiring a receiver flow table delivered by the receiver server, the receiver server being configured to: establish a remote direct memory access (RDMA) connection to a sender server, generating the receiver flow table in a process of establishing the RDMA connection, and delivering the receiver flow table to the receiver network adapter; and decapsulating, in response to that the tunnel data packet successfully matches the receiver flow table, the tunnel data packet to obtain the original data packet and the tenant identifier.

In some embodiments, the receiver flow table includes a match, the match includes a fourth IP address, a first IP address, a tenant identifier, a layer 3 protocol number, and an application layer port number, the fourth IP address is an IP address of the sender network adapter, the first IP address is an IP address of the receiver network adapter, the tunnel data packet includes a fourth IP address, a first IP address, a tenant identifier, a layer 3 protocol number, and an application layer port number. The at least one program code is executed by the receiver network adapter to implement the following operation:

determining, in response to that the fourth IP address, the first IP address, the tenant identifier, the layer 3 protocol number, and the application layer port number in the tunnel data packet are the same as the fourth IP address, the first IP address, the tenant identifier, the layer 3 protocol number, and the application layer port number in the match, that the tunnel data packet successfully matches the receiver flow table.

A person of ordinary skill in the art may understand that all or some of the steps of the foregoing embodiments may be implemented by hardware, or may be implemented by a program instructing related hardware. The program may be stored in a computer-readable storage medium. The storage medium may be a read-only memory, a magnetic disk, or an optical disc.

The foregoing descriptions are merely optional embodiments of the embodiments of this application, but are not intended to limit the embodiments of this application. Any modification, equivalent replacement, or improvement made within the spirit and principle of the embodiments of this application shall fall within the protection scope of this application.

What is claimed is:

1. A data transmission method performed by a sender network adapter associated with a sender server, the method comprising:

acquiring an original data packet, a first address, and a tenant identifier, the first address comprising an address of a receiver network adapter associated with a receiver server for receiving the original data packet, wherein the address of the receiver network adapter further comprises a first Media Access Control (MAC) address and a first internet protocol (IP) address of the receiver network adapter, and the original data packet comprises a header including a second address and a body including transmission data, the second address further comprises a second MAC address and a second IP address of a receiver virtual machine associated with the receiver server, and the tenant identifier indicating a corresponding tenant on the receiver server, wherein there is a remote direct memory access (RDMA) connection between the sender server and the receiver server and the original data packet is an RDMA data packet;

performing tunnel encapsulation on the original data packet based on the first address and the tenant identifier to obtain a tunnel data packet, the tunnel data packet including a header and a body, further including:
deleting the second MAC address of the original data packet;
adding the second IP address and the transmission data of the original data packet to the body of the tunnel data packet;
adding the first MAC address, the first IP address, and the tenant identifier to the header of the tunnel data packet; and sending the tunnel data packet to the receiver network adapter corresponding to the first address.

2. The method according to claim 1, wherein the header of the original data packet comprises a second MAC address field and a second IP address field, the second MAC address field comprises the second MAC address, the second IP address field comprises the second IP address, an explicit congestion notification (ECN) value, and a differentiated services code point (DSCP) value;

the header of the tunnel data packet comprises a first MAC address field, a first IP address field, and a tunneling protocol field, the first MAC address field comprises the first MAC address, the first IP address field comprises the first IP address, the tunneling protocol field comprises the tenant identifier; and the method further comprises:

writing the ECN value in the second IP address field and the DSCP value in the second IP address field to the first IP address field of the tunnel data packet.

3. The method according to claim 1, wherein the sender network adapter is a network adapter supporting RDMA over Converged Ethernet (RoCE), and the acquiring an original data packet, a first address, and a tenant identifier comprises:

acquiring a sender flow table and the original data packet that are delivered by a sender server, the sender flow table comprising the first address and the tenant identifier; and the sender server is configured to: establish the RDMA connection to the receiver server in response to that an original data packet acquired by a sender virtual machine is received, generate the sender flow table in a process of establishing the RDMA connection, deliver the sender flow table to the sender network adapter, and deliver the original data packet to the sender network adapter.

4. The method according to claim 3, wherein the performing tunnel encapsulation on the original data packet based on the first address and the tenant identifier to obtain a tunnel data packet comprises:

performing, in response to that the original data packet successfully matches the sender flow table, tunnel encapsulation on the original data packet based on the first address and the tenant identifier to obtain the tunnel data packet.

5. The method according to claim 4, wherein the sender flow table further comprises a match, the match comprises a third IP address, a second IP address, a network adapter physical port number, a layer 3 protocol number, and an application layer port number, the third IP address is an IP address of the sender virtual machine, the second IP address is an IP address of a receiver virtual machine, and the method further comprises:
  determining, in response to that a third IP address, a second IP address, a network adapter physical port number, a layer 3 protocol number, and an application layer port number that correspond to the original data packet are the same as the third IP address, the second IP address, the network adapter physical port number, the layer 3 protocol number, and the application layer port number in the match, that the original data packet successfully matches the sender flow table.

6. The method according to claim 1, wherein the receiver network adapter is configured to perform a plurality of operations including:
  receiving the tunnel data packet sent by the sender network adapter;
  decapsulating the tunnel data packet to obtain the original data packet and the tenant identifier; and
  transmitting the original data packet and the tenant identifier to the receiver server.

7. The method according to claim 6, wherein the decapsulating the tunnel data packet to obtain the original data packet and the tenant identifier comprises:
  acquiring the tenant identifier in the tunnel data packet; and
  deleting the first MAC address and the first IP address in the tunnel data packet to obtain the original data packet.

8. The method according to claim 6, wherein the receiver network adapter is a network adapter supporting RDMA over Converged Ethernet (RoCE), and the decapsulating the tunnel data packet to obtain the original data packet and the tenant identifier comprises:
  acquiring a receiver flow table delivered by the receiver server, the receiver server being configured to: establish a remote direct memory access (RDMA) connection to a sender server, generate the receiver flow table in a process of establishing the RDMA connection, and deliver the receiver flow table to the receiver network adapter; and
  decapsulating, in response to that the tunnel data packet successfully matches the receiver flow table, the tunnel data packet to obtain the original data packet and the tenant identifier.

9. The method according to claim 8, wherein the receiver flow table comprises a match, the match comprises a fourth IP address, a first IP address, a tenant identifier, a layer 3 protocol number, and an application layer port number, the fourth IP address is an IP address of the sender network adapter, the first IP address is an IP address of the receiver network adapter, the tunnel data packet comprises a fourth IP address, a first IP address, a tenant identifier, a layer 3 protocol number, and an application layer port number, and the method further comprises:
  determining, in response to that the fourth IP address, the first IP address, the tenant identifier, the layer 3 protocol number, and the application layer port number in the tunnel data packet are the same as the fourth IP address, the first IP address, the tenant identifier, the layer 3 protocol number, and the application layer port number in the match, that the tunnel data packet successfully matches the receiver flow table.

10. A sender network adapter associated with a sender server, comprising a processor and a memory storing a plurality of programs that, when executed by the processor, cause the sender network adapter to perform a plurality of operations including:
  acquiring an original data packet, a first address, and a tenant identifier, the first address comprising an address of a receiver network adapter associated with a receiver server for receiving the original data packet, wherein the address of the receiver network adapter further comprises a first Media Access Control (MAC) address and a first internet protocol (IP) address of the receiver network adapter, and the original data packet comprises a header including a second address and a body including transmission data, the second address further comprises a second MAC address and a second IP address of a receiver virtual machine associated with the receiver server, and the tenant identifier indicating a corresponding tenant on the receiver server, wherein there is a remote direct memory access (RDMA) connection between the sender server and the receiver server and the original data packet is an RDMA data packet;
  performing tunnel encapsulation on the original data packet based on the first address and the tenant identifier to obtain a tunnel data packet, the tunnel data packet including a header and a body, further including:
    deleting the second MAC address of the original data packet;
    adding the second IP address and the transmission data of the original data packet to the body of the tunnel data packet;
    adding the first MAC address, the first IP address, and the tenant identifier to the header of the tunnel data packet; and
  sending the tunnel data packet to the receiver network adapter corresponding to the first address.

11. The sender network adapter according to claim 10, wherein the header of the original data packet comprises a second MAC address field and a second IP address field, the second MAC address field comprises the second MAC address, the second IP address field comprises the second IP address, an explicit congestion notification (ECN) value, and a differentiated services code point (DSCP) value;
  the header of the tunnel data packet comprises a first MAC address field, a first IP address field, and a tunneling protocol field, the first MAC address field comprises the first MAC address, the first IP address field comprises the first IP address, the tunneling protocol field comprises the tenant identifier; and the method further comprises:
  writing the ECN value in the second IP address field and the DSCP value in the second IP address field to the first IP address field of the tunnel data packet.

12. The sender network adapter according to claim 10, wherein the sender network adapter is a network adapter supporting RDMA over Converged Ethernet (RoCE), and the acquiring an original data packet, a first address, and a tenant identifier comprises:
  acquiring a sender flow table and the original data packet that are delivered by a sender server, the sender flow table comprising the first address and the tenant identifier; and
  the sender server is configured to: establish the RDMA connection to the receiver server in response to that an original data packet acquired by a sender virtual machine is received, generate the sender flow table in a process of establishing the RDMA connection, deliver the sender flow table to the sender network adapter, and deliver the original data packet to the sender network adapter.

13. The sender network adapter according to claim 12, wherein the performing tunnel encapsulation on the original data packet based on the first address and the tenant identifier to obtain a tunnel data packet comprises:
- performing, in response to that the original data packet successfully matches the sender flow table, tunnel encapsulation on the original data packet based on the first address and the tenant identifier to obtain the tunnel data packet.

14. The sender network adapter according to claim 13, wherein the sender flow table further comprises a match, the match comprises a third IP address, a second IP address, a network adapter physical port number, a layer 3 protocol number, and an application layer port number, the third IP address is an IP address of the sender virtual machine, the second IP address is an IP address of a receiver virtual machine, and the method further comprises:
- determining, in response to that a third IP address, a second IP address, a network adapter physical port number, a layer 3 protocol number, and an application layer port number that correspond to the original data packet are the same as the third IP address, the second IP address, the network adapter physical port number, the layer 3 protocol number, and the application layer port number in the match, that the original data packet successfully matches the sender flow table.

15. A non-transitory computer-readable storage medium, storing a plurality of programs, the plurality of programs being executed by a processor of a sender network adapter associated with a sender server to perform a plurality of operations including:
- acquiring an original data packet, a first address, and a tenant identifier, the first address comprising an address of a receiver network adapter associated with a receiver server for receiving the original data packet, wherein the address of the receiver network adapter further comprises a first Media Access Control (MAC) address and a first internet protocol (IP) address of the receiver network adapter, and the original data packet comprises a header including a second address and a body including transmission data, the second address further comprises a second MAC address and a second IP address of a receiver virtual machine associated with the receiver server, and the tenant identifier indicating a corresponding tenant on the receiver server, wherein there is a remote direct memory access (RDMA) connection between the sender server and the receiver server and the original data packet is an RDMA data packet;
- performing tunnel encapsulation on the original data packet based on the first address and the tenant identifier to obtain a tunnel data packet, the tunnel data packet including a header and a body, further including:
  - deleting the second MAC address of the original data packet;
  - adding the second IP address and the transmission data of the original data packet to the body of the tunnel data packet;
  - adding the first MAC address, the first IP address, and the tenant identifier to the header of the tunnel data packet; and
- sending the tunnel data packet to the receiver network adapter corresponding to the first address.

16. The non-transitory computer-readable storage medium according to claim 15, wherein the header of the original data packet comprises a second MAC address field and a second IP address field, the second MAC address field comprises the second MAC address, the second IP address field comprises the second IP address, an explicit congestion notification (ECN) value, and a differentiated services code point (DSCP) value;
- the header of the tunnel data packet comprises a first MAC address field, a first IP address field, and a tunneling protocol field, the first MAC address field comprises the first MAC address, the first IP address field comprises the first IP address, the tunneling protocol field comprises the tenant identifier; and the method further comprises:
- writing the ECN value in the second IP address field and the DSCP value in the second IP address field to the first IP address field of the tunnel data packet.

17. The non-transitory computer-readable storage medium according to claim 15, wherein the sender network adapter is a network adapter supporting RDMA over Converged Ethernet (ROCE), and the acquiring an original data packet, a first address, and a tenant identifier comprises:
- acquiring a sender flow table and the original data packet that are delivered by a sender server, the sender flow table comprising the first address and the tenant identifier; and
- the sender server is configured to: establish the RDMA connection to the receiver server in response to that an original data packet acquired by a sender virtual machine is received, generate the sender flow table in a process of establishing the RDMA connection, deliver the sender flow table to the sender network adapter, and deliver the original data packet to the sender network adapter.

\* \* \* \* \*